(12) United States Patent
Millar et al.

(10) Patent No.: US 10,749,554 B1
(45) Date of Patent: Aug. 18, 2020

(54) SYSTEM AND METHOD FOR SHORT BLOCK LENGTH DISTRIBUTION MATCHING

(71) Applicant: Mitsubishi Electric Research Laboratories, Inc., Cambridge, MA (US)

(72) Inventors: David Millar, Concord, MA (US); Toshiaki Koike-Akino, Belmont, MA (US); Kieran Parsons, Cambridge, MA (US); Keisuke Kojima, Weston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/590,986

(22) Filed: Oct. 2, 2019

Related U.S. Application Data

(63) Continuation-in-part of application No. 16/370,237, filed on Mar. 29, 2019, now Pat. No. 10,541,711.

(51) Int. Cl.
*H04B 1/10* (2006.01)
*H04L 1/00* (2006.01)
*H04L 27/36* (2006.01)
*H04L 27/00* (2006.01)

(52) U.S. Cl.
CPC ............ *H04B 1/10* (2013.01); *H04L 1/0041* (2013.01); *H04L 1/0058* (2013.01); *H04L 27/0002* (2013.01); *H04L 27/361* (2013.01); *H04L 27/366* (2013.01)

(58) Field of Classification Search
CPC ... H04L 1/0057; H04L 1/0058; H04L 1/0042; H04B 10/516
See application file for complete search history.

(56) References Cited

U.S. PATENT DOCUMENTS 10,069,519 B1 *  9/2018  Millar ............... H03M 13/05
2013/0346451 A1 * 12/2013  Zhou ................. H04L 9/0836
                                                      707/797

* cited by examiner

*Primary Examiner* — Kevin Kim
(74) *Attorney, Agent, or Firm* — Gennadiy Vinokur; James McAleenan; Hironori Tsukamoto

(57) ABSTRACT

A communication system transmits an input block of bits over a communication channel using a prefix tree that maps a dyadic distribution of compositions of output symbols to prefixes of variable lengths. A path to each leaf of the prefix tree is defined by a prefix formed by a unique sequence of binary values of a length equal to a depth of the leaf. Each leaf is associated with a composition that has at least a number of unique permutations equals to two in a power of a length of a suffix of the block of input bits. The system selects a composition identified in the prefix tree by a prefix, permutes the selected composition according to a suffix, and transmits the permuted composition over a communication channel. The compositions are selected to reduce one or combination of energy and kurtosis of transmission.

20 Claims, 22 Drawing Sheets

| Number of permutations | Bits of Huffman code |
|---|---|
| 1 | N |
| 2 | N-1 |
| ... | ... |
| $2^{(N-1)}$ | 1 |

FIG. 2D

| Number of permutations | Bits of Huffman code |
|---|---|
| $2^{(N-p)}$ | p |
| $2^{(N-p+1)}$ | p+1 |
| ... | ... |
| $2^{(N-1)}$ | 1 |

FIG. 2E

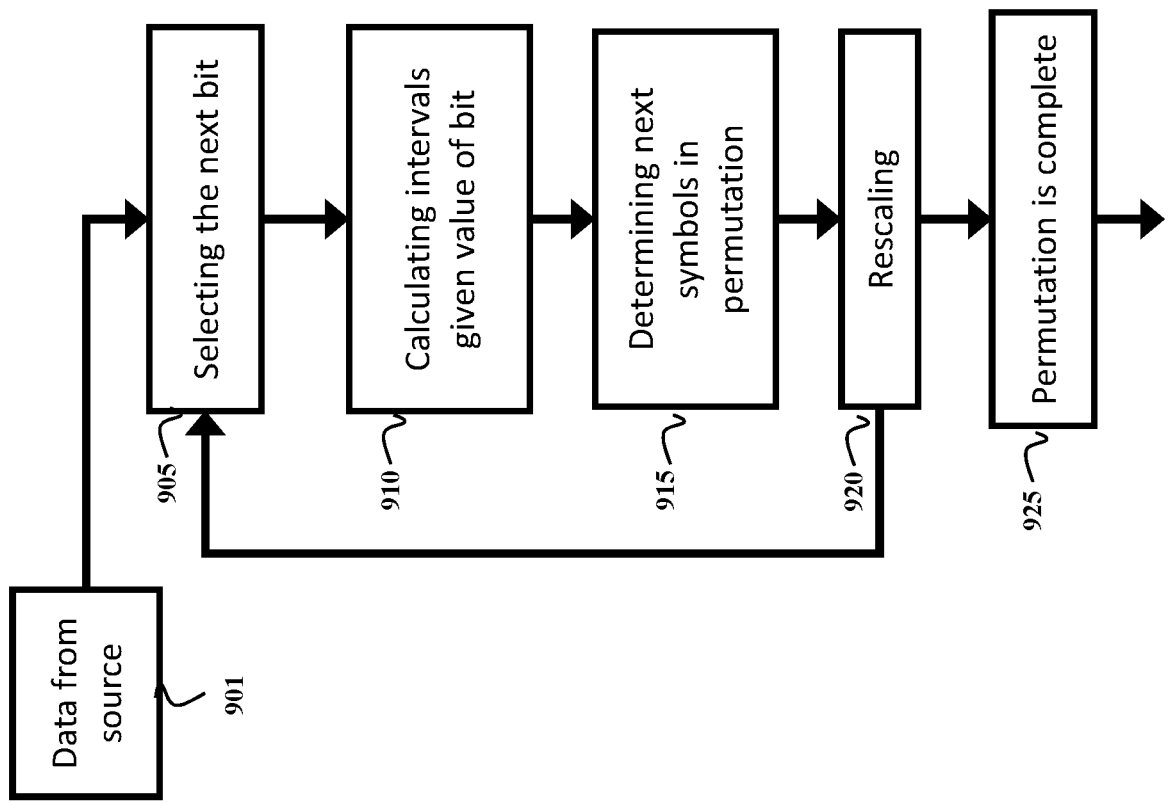

SYSTEM AND METHOD FOR SHORT BLOCK LENGTH DISTRIBUTION MATCHING

RELATED APPLICATION

This application is related to co-pending application Ser. No. 16/370,237 filed by Millar et al. for "Short Block Length Distribution Matching Algorithm" on Mar. 29, 2019.

TECHNICAL FIELD

This invention relates generally to digital communications systems, and more particularly to encoding and decoding data transmitted over a noisy channel.

BACKGROUND

Since the birth of digital communications, it has been known that the optimal signal distribution for an additive white Gaussian noise channel is not uniform. There are two primary approaches to generate the non-uniform distribution for digital communications systems—geometric shaping, whereby equiprobable constellation points are arranged in a non-uniform manner in order to maximize performance; and probabilistic shaping, whereby the probabilities of constellation points are optimized in order to maximize performance. While it is generally accepted that the performance of probabilistic shaping is superior to the performance of geometric shaping for equal cardinality, methods for mapping sequences of uniformly distributed bits of information (such as those which we would like to transmit) onto sequences of non-equiprobable symbols has proven extremely challenging. The most commonly used method is that of constant composition distribution matching (CCDM), which maps equiprobable bits onto a sequence which is a permutation of the "typical sequence," which has the desired symbol probability mass function (PMF). While this method can achieve good performance (achieving arbitrarily low rate loss for asymptotically long symbol sequences), it has two critical flaws: the ability to achieve low rate-loss requires very long sequences, which causes high complexity and latency; and the only known efficient mapping and de-mapping algorithms are sequential in symbols (that is, need to decode each symbol in-turn in a symbol sequence), which also leads to prohibitively high complexity and latency. Some of those problems are addressed in U.S. Pat. No. 10,069,519.

SUMMARY

It is an object of some embodiments to transform an input sequence of symbols with equiprobable, i.e., uniform, distribution of values of bits into an output sequence of symbols with values of bits and/or symbols with desired non-uniform distribution. Some embodiments are based on the realization that the optimal set of non-uniformly distributed symbol sequences given a specified channel SNR is one that is bounded by a certain energy. According to this realization, near optimal performance may be achieved with reduced implementation complexity by approximating this set of symbol sequences closely, while introducing structure such that the process of encoding and decoding is simplified.

Some embodiments are based on the realization that by grouping all sequences within the energy bound by their composition, it is possible to select a composition from a binary tree, and then separately address the permutation of the composition to specify a unique sequence. Some embodiments are based on the additional realization that by using only a maximal power of two sequences in each composition, the distribution of sequences amongst compositions will be dyadic, and therefore the compositions may be addressed with a Huffman code (or prefix code) which uniquely selects a composition with a variable length prefix.

Some embodiments are based on realization that for any given alphabet, there is a set of unique compositions of symbols of that alphabet that can be used by distribution matchers to map input bits into output symbols. Each composition can have a number of permutations, such that each composition can be used to transform a number of blocks of different variations of the input bits that is equal to the number of permutations. For example, if a composition has 10 possible permutations, the same composition can be used to map 10 different combinations of input bits. Each composition has an energy determined by the energy of transmission of the symbols of the composition. All permutations of the same composition have the same energy.

For example, in some embodiments, the alphabet of the compositions includes a subset of integer numbers. Hence, a distribution matcher maps the input bits to a sequence of integer numbers with each number uniquely describing a subset of the shaped bits. In turn, the sequence of integer numbers of the shaped bits can be mapped to amplitudes of a signal transmitted over channel, such as wired or wireless channel. The amplitudes reflect the energy of the signal. Hence, this energy can be attributed to the composition. It is an object of some embodiments to provide a distribution matcher that reduces energy of transmission for a fixed transmission rate. In effect, such a reduction allows reducing a rate-loss for a specified per-dimension cardinality of a block of input bits.

Some embodiments are based on recognition that an optimal rate-loss can be achieved by selecting compositions and their permutations with minimum total energy. Such a selection can be achieved by including all permutations with energy lower than that specified by an energy bound. Such a selection provides the maximum number of permutations for an average energy given the per-dimension cardinality. Hence, using only all these permutations is optimal in the sense of having the lowest possible rate-loss at a given average energy and sequence length, for a specified per-dimension cardinality of a block of input bits. However, the resulting optimal distribution matcher would have a computationally expensive matching mechanism.

Additionally, or alternatively, it is an object of some other embodiments to provide a distribution matcher that can provide an optimized balance of higher order statistical moments such as kurtosis and power in signal transmission. In effect, such a combination can reduce distortion of the transmission. For example, the distortion due to optical nonlinearities may be minimized when the signal is transmitted over an optical fiber channel.

Some embodiments are based on realization that the cause of complication for such a matching mechanism lies in the fact that the selected compositions have arbitrarily different number of permutations. The arbitrarily different number of permutations complicates the matching procedure. Some embodiments are based on realization that by enforcing additional constraint on the number of permutations for each composition, the matching procedure can be simplified on expense of a slight increase of rate-loss of transmission. Some embodiments are based on recognition that such an increase of the rate-loss can be well justified with simplified matching and dematching procedure.

To that end, some embodiment impose an additional constraint on the selected composition and their permutations provided that for each selected composition only a power of two numbers of permutations are included in the distribution matcher for CCDM. Some embodiments are based on realization that if the distribution of the number of permutations in each composition is dyadic, it is possible to use a variable length Huffman code mapping to select the desired composition without additional rate-loss, and then use encoding and decoding techniques for constant-composition distribution matching (CCDM). To that end, some embodiments impose a structure on the sphere-bound distribution matcher to select only a power of two number of permutations for each composition. This constraint forces a dyadic distribution of compositions, which enables the use of Huffman coding to map the compositions, and a fixed input bit block length. In effect, such an imposed structure allows to have simplified encoding and decoding at the penalty of some small amount of rate-loss.

To reduce rate-loss of transmission subject to the additional constraint, some embodiments select a number of possible permutations for each composition as a power of two resulting in the minimum total energy of the selected permutations of the compositions. Additionally, or alternatively some embodiments select the compositions in the dyadic distribution of compositions to reduce one or combination of energy and kurtosis of transmission.

For example, some embodiments are based on recognition that an optimal rate-loss can be achieved by selecting compositions and their permutations with minimum total energy with some excess number of permutations to create a first selection. Such a selection can be achieved by including all permutations with energy lower than that specified by an energy point in the distribution matcher. The compositions in the first selection may then be sorted according to their relative kurtosis to create a second selection with the desired number of total permutations. Such a selection can be achieved by including all permutations with kurtosis lower than that specified by a level specified in the distribution matcher. Such a selection provides the maximum number of permutations for an energy bound, determined by the first selection, and a kurtosis bound determined by the second selection, given the per-dimension cardinality. Hence, the resulting distribution matcher having all these permutations is optimal in the sense of having the lowest possible rate-loss at a given maximum sequence energy, kurtosis and sequence length, for a specified per-dimension cardinality of a block of input bits. However, the resulting optimal distribution matcher would have a computationally expensive matching mechanism.

By having a number of permutations for each composition as a power of two allows us to use the Huffman code to map at least a part of a codeword to a composition in a set of possible compositions without rate loss. The remaining part of the codeword is optionally used to select a permutation within the composition. Some embodiments organize the selected composition into a prefix tree, such that a path from a root node to each leaf is defined by unique sequence of binary value referred herein as a prefix or prefix code or Hufmann code. Each composition has a sufficient number of permutations governed by the length of the path or a prefix leading to that combination on the prefix tree. This constraint forces a dyadic distribution, which enables the use of Huffman coding to map the compositions, and a fixed input bit block length.

In effect, the prefix tree simplifies the selection of composition and guaranties a unique permutation of the selected composition for any values of the input bits. When the composition is selected in consideration of the energy bound and/or kurtosis, in addition to the simplification of the matching complexity, the prefix tree also reduces the energy of the transmitted signal to reduce rate loss of transmission.

For example, the length of the input block of bits defines an energy bound which is a minimum energy allowing a number of compositions having a number of permutations sufficient to encode the input block of bits and having energy not greater than the energy bound. To consider both the energy and kurtosis, the dyadic distribution of compositions of some embodiments include at least one composition with energy greater than the energy bound that replaces in the dyadic distribution a composition with energy below the energy bound but having a kurtosis above a threshold.

By considering both the energy and the kurtosis, some embodiments select the compositions in the dyadic distribution to have a minimum total energy for a total kurtosis. In other words, for a given total kurtosis, the energy of the compositions is minimized. Similarly, some embodiments select the compositions in the dyadic distribution to have a minimum total kurtosis for a total energy. In other words, for a given total energy, the kurtosis of the compositions is minimized.

Some embodiments are also based on recognition that in the optical communication when the communication channel is an optical fiber channel, a total energy of the compositions in the dyadic distribution is a second statistical moment of transmission over the optical fiber channel and a total kurtosis of the compositions in the dyadic distribution is a fourth statistical moment of the transmission over the optical fiber channel. The compositions depend on these second and fourth statistical properties as well as on a sixth statistical moment of the transmission of the optical fiber channel referred herein as a hypertailedness. To that end, some embodiments select the compositions in the dyadic distribution to maximize a function relating a signal to noise ratio (SNR) of the optical fiber channel to the total energy, the total kurtosis, and the hypertailedness. The parameters of the function are properties of the optical fiber channel. For example, the function is an extended Gaussian noise model of the optical fiber channel.

In effect, the prefix tree allows to simplify matching and dematching process between input blocks of bits and output symbols with non-uniform distribution. In addition, the composition selected with respect to the energy bound and kurtosis allows to reduce rate loss of transmission. In combination, the prefix tree and the consideration of the energy bound and kurtosis simplify the transmission process allowing to reduce complexity of the hardware of communication system while reducing the rate loss of the transmission.

Accordingly, one embodiment discloses a communication system including an input interface configured to receive an input block of bits; a memory to store a prefix tree that maps a dyadic distribution of compositions of output symbols to prefixes of variable lengths, wherein a path from a root node of the prefix tree to each leaf of the prefix tree is defined by a prefix formed by a unique sequence of binary values of a length that is equal to a depth of the leaf, wherein each leaf in the prefix tree is associated with a composition that has at least a number of unique permutations equals to two in a power of a length of a suffix defined by a difference between the length of the block of input bits and the length of the prefix of the leaf, wherein compositions in the dyadic distribution of compositions are selected to reduce one or combination of energy and kurtosis of transmission; a processor configured to execute a composition selector to select a composition identified in the prefix tree by a prefix in the input block of bits and to execute a permutation mapper to permute the selected composition according to a suffix in the input block of bits; and a transmitter front end configured to transmit the permuted composition over a communication channel.

Another embodiment discloses a communication method for transmitting a block of input bits over a communication channel, wherein the method uses a processor coupled to a memory storing a prefix tree that maps a dyadic distribution of compositions of output symbols to prefixes of variable lengths, wherein a path from a root node of the prefix tree to each leaf of the prefix tree is defined by a prefix formed by a unique sequence of binary values of a length that is equal to a depth of the leaf, wherein each leaf in the prefix tree is associated with a composition that has at least a number of unique permutations equals to two in a power of a length of a suffix defined by a difference between the length of the block of input bits and the length of the prefix of the leaf, wherein compositions in the dyadic distribution of compositions are selected to reduce one or combination of energy and kurtosis of transmission, wherein the processor is coupled with stored instructions implementing the method, wherein the instructions, when executed by the processor carry out steps of the method, that includes selecting a composition identified in the prefix tree by a prefix in the input block of bits; permuting the selected composition according to a suffix in the input block of bits; and transmitting the permuted composition over a communication channel.

DEFINITIONS

As used herein, an input block of bits is a sequence of binary values with equal probability of being either 0 or 1, wherein the length of the input block of bits equals the length of the sequence of binary values and is a constant and a finite number.

As used herein, an output block of symbols is a sequence of values selected from a finite alphabet, wherein each symbol of the alphabet is associated with a unique value of energy for transmitting the symbol. For example, if the alphabet is an alphabet of integer numbers, each integer number is uniquely mapped to a value of amplitude of the transmitted signal encoding the number. The length of the sequence is a constant and a finite number, the length of the output block of symbols equals the length of the sequence of integer values and is a constant and a finite number, and the length of the input block of bits is the same or different from the length of the output block of symbols.

As used herein, a composition is a multiset of symbols of the alphabet of the output block of symbols. For example, an exemplar composition C of alphabet abcd may be described as a multiset $C=\{a,a,a,a,b,b,b,c,c,d\}$ where a, b, c and d are different symbols of the alphabet. The cardinality of compositions is finite and equals to the length of the output block of symbols. The cardinality of the multiset C is 10.

As used herein, a permutation of a composition is a unique ordering of symbols of the composition. For example, a permutation of a multiset $C=\{a,a,a,a,b,b,b,c,c,d\}$ can be received by changing the location of last two symbols to receive a permutation $\{a,a,a,a,b,b,b,c,d,c\}$. Each output block of symbols is a permutation of a composition.

As used herein, sphere bound of permutations of compositions is a set of permutations that each have energy less than or equal to an energy bound. The energy bound is selected such that a number of all possible permutations of low-energy compositions with energies below or equal to the energy bound is equal or greater than a number of all possible variations of values of bits in the input block of bits.

As used herein, a prefix tree is a full binary tree such that every node has two children and each branch is associated with either 0 or 1 value, such that a path from a root node to each leaf is defined by unique sequence of binary value referred herein as a prefix or prefix code or Hufmann code. Each leaf of the prefix tree is associated with a composition. The compositions in the prefix tree can be unique or can have multiple occurrences.

In cases when each composition in the prefix tree have a unique occurrence, each leaf in the prefix tree is associated with a composition that have at least a number of unique permutations equals two in a power of a length of a suffix defined by a difference between the length of the block of input bits and the length of the prefix defined by the depth of the leaf.

In cases when the compositions in the prefix tree have multiple occurrences, each leaf is further associated with a rank offset, such that a combination of the composition with its rank offset is unique to the prefix tree. Each leaf in the prefix tree is associated with a rank offset, which is equal to the sum of power of two of the lengths of the suffixes of leafs of lower depth associated with the same composition.

As used herein, a dyadic distribution of compositions is such that a probability mass function of each composition in the dyadic distribution is two in a power of –N. To achieve such a dyadic distribution of compositions, each composition should be represented in the dyadic distribution of compositions with power of two numbers of its permutations. In addition, a total number of permutations in the dyadic distribution of compositions should also be a power of two.

As used herein, a Huffman code is an optimal prefix code that can be used for lossless data compression.

As used herein, permutation demapping is the process of mapping between a permutation, and an integer or block of bits which uniquely identifies that permutation amongst other permutations of the same composition.

As used herein, permutation mapping is the process of mapping between an integer or block of bits, and a permutation, which is unique amongst other permutations of the same composition.

BRIEF DESCRIPTION OF THE DRAWINGS

FIGS. 2D and 2E show tables with a number of permutations according to some embodiments.

FIG. 9A shows a schematic of permutation mapping using an algebraic encoding method for constant composition distribution matching according to one embodiment.

DETAILED DESCRIPTION

Figure 1A:
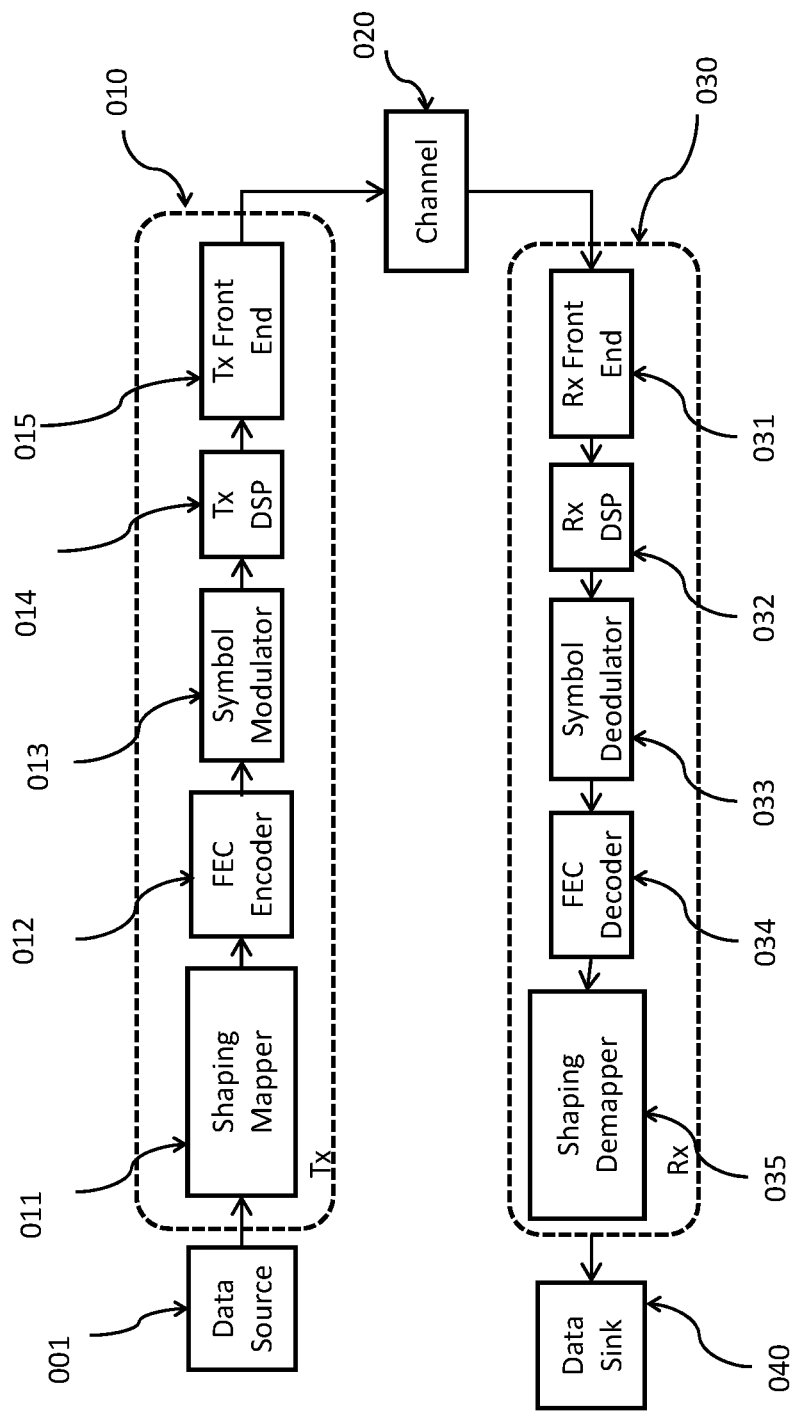
FIG. 1A shows a block diagram of a communication system according to some embodiments.

FIG. 1A shows a generic block diagram of a communication system according to some embodiments. Data from a source (001) is sent to a transmitter (Tx) (010). For example, the data is first sent to a shaping mapper (011) and then the data is sent to a forward error correction (FEC) encoder block (012) to produce a set of bits where some bits are shaped, and, optionally, some other bits (for example, parity bits from the FEC encoder) are uniformly distributed. After encoding, the bits are mapped to quadrature amplitude modulation (QAM) symbols (013), before the signal undergoes digital signal processing (DSP) (014). In some embodiments, DSP also performs other function such as mapping, filtering and pre-equalization. The signal is then sent to the transmitter front end (015), where analog operations such as amplification, filtering, modulation and up-conversion occur, and then transmitted over a channel (020) to a receiver (Rx) (030). The channel (020) can be wired or wireless communication channel Example of the channel (020) is an optical communication link.

At the receiver, the signal first passes through the receiver front end (031) for performing analog operations such as down-conversion, amplification, filtering and quantization of the received signal to produce a digital signal. The digital signal is processed by digital processor (032) for functions such as front-end correction, chromatic dispersion compensation, equalization and carrier phase estimation. The noisy QAM symbols then undergo demapping (033) to, for example, bit log-likelihood ratios (LLRs). The FEC code is then decoded (034), before the decoded bits are sent to the probabilistic shaping demapper (035). The demapped and uniformly distributed bits are then sent on to their destination, e.g., the data sink (040).

Figure 1B:
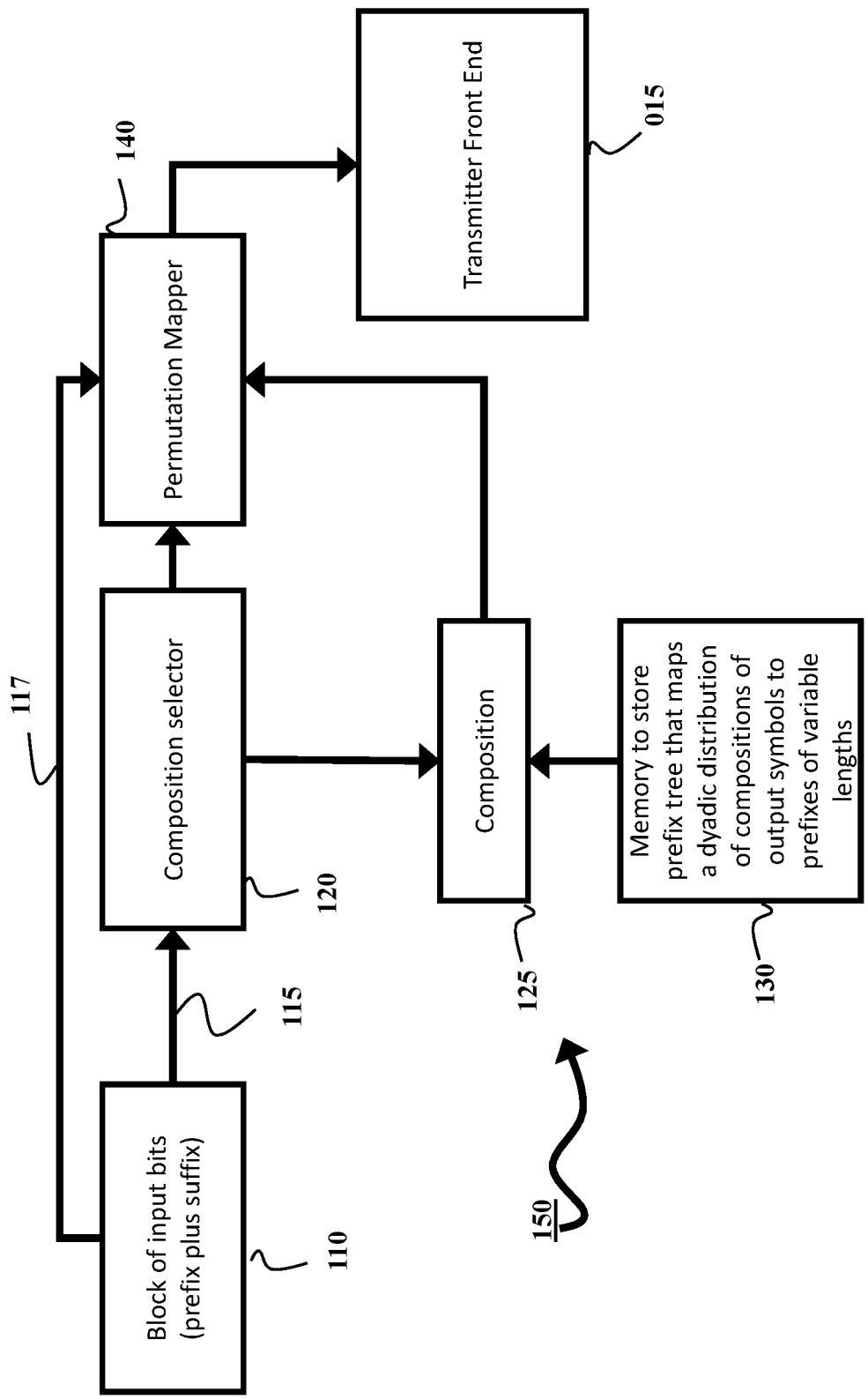
FIG. 1B shows a block diagram of components a communication system according to some embodiments.

FIG. 1B shows a block diagram of components a communication system according to some embodiments. The system includes an input interface and/or a data source configured to receive an input block of bits 110. The input block of bits 110 includes a prefix 115 followed by a suffix 117. The prefix and the suffix can be of variable length, but total to the length of the input block of bits 110. In some embodiments, the length of the suffix is governed by the length of the prefix. For example, if the length of the input block of bits is 10 bits, and the length of the prefix is three bits, then the length of the suffix is seven bits. For example, if the length of the input block of bits is 10 bits, and the length of the prefix is two bits, then the length of the suffix is eight bits.

The system of FIG. 1B also includes a memory 130 configured to store a prefix tree that maps a dyadic distribution of compositions of output symbols to prefixes of variable lengths. A path from a root node of the prefix tree to each leaf of the prefix tree is defined by a prefix formed by a unique sequence of binary values of a length that is equal to a depth of the leaf. In such a manner, a composition selector 120 can select a composition 125 identified in the prefix tree by a prefix 110 in the input block of bits.

As used herein, a prefix tree is a full binary tree such that every node has two children and each branch is associated with either 0 or 1 value, such that a path from a root node to each leaf is defined by unique sequence of binary value referred herein as a prefix or prefix code or Hufmann code. Each leaf of the prefix tree is associated with a composition. The compositions in the prefix tree can be unique or can have multiple occurrences. The path from the root node to the leaf node can be of variable length in dependence of the depth of the leaf in the prefix tree. The path to the leaf and/or its depth defines the length of the prefix 115 and accordingly the length of the suffix 117.

Each leaf in the prefix tree is associated with a composition, such as a composition 125, that has at least a number of unique permutations equals two in a power of a length of a suffix defined by a difference between the length of the block of input bits and the length of the prefix of the leaf. For example, a composition associated with a leaf with a depth five has at least two in a power of five possible unique permutations. The composition can have more than the two in a power of five possible unique permutations, but not less.

As used herein, a composition is a multiset of symbols of the alphabet of the output block of symbols. For example, an exemplar composition C of alphabet abcd may be described as a multiset C={a,a,a,a,b,b,b,c,c,d} where a, b, c and d are different symbols of the alphabet. The cardinality of compositions is finite and equals the length of the output block of symbols. The cardinality of the multiset C is 10. As used herein, a permutation of a composition is a unique ordering of symbols of the composition. For example, a permutation of a multiset C={a,a,a,a,b,b,b,c,c,d} can be received by changing the location of last two symbols to receive a permutation {a,a,a,a,b,b,b,c,d,c}.

To that end, the communication system of FIG. 1B includes a processor 150 configured to execute a composition selector 120 to select a composition 125 identified in the prefix tree by a prefix 115 in the input block of bits and to execute a permutation mapper 140 to permute the selected composition 125 according to a suffix 117 in the input block of bits.

For example, in one embodiment, the permutation mapper permutes the selected composition using an arithmetic coding for a constant composition distribution matching, wherein the suffix in the input block of bits is an input vector to the arithmetic coding. In another embodiment, the permutation mapper permutes the selected composition using a multiset ranking mapping between the input block of bits and the permuted composition. In another embodiment, the permutation mapper permutes the selected composition using at least two parallel binary mappings between at least two subsets of the input block of bits and at least two binary permutations of the composition.

In such a manner, the communication system of some embodiments allows for efficient mapping between different blocks of input bits and blocks of output symbols for a specified composition. The communication system also uses a transmitter front end 015 configured to transmit the permuted composition over a communication channel.

In such a manner, some embodiments can transform an input sequence of symbols with equiprobable, i.e., uniform, distribution of values of bits into an output sequence of symbols with values of bits with desired non-uniform distribution. Some embodiments select sequences bounded by a certain energy, and group those sequences by composition, where each composition has a number of possible unique permutations. In such a manner, the desired total distribution of the symbol set is achieved by using a number of smaller sets which do not individually have the desired distribution, but have an average distribution which is equal to the desired distribution. In some embodiments, the distribution is defined by an approximation of the distribution of sequences within a determined energy bound.

Specifically, some embodiments are based on realization that the input sequence of symbols can be transformed on block-by-block bases. For example, some embodiments transform a block of bits with uniform distribution of values of bits into a block of shaped bits with a non-uniform distribution of values of bits. However, some embodiments are based on realization that while optimal performance can be achieved by not excluding any possible sequence with energy less than a certain bound. Accordingly, some embodiments are based on a further realization that near optimal performance may be achieved by approximating this distribution closely, while including structure in order to simplify the encoding and decoding procedures.

Some embodiments are based on realization that by considering the set of sequences within a sphere as a set of compositions, we may use lower the of complexity mapping and demapping, by introducing structure. For example, if we consider a set of compositions with numbers of permutations {18,33,24} respectively, by using only a subset of these permutations, in order to achieve numbers of permutations of {16,32,16} in total. While this method reduces the total number of sequences which are addressed by the algorithm (and therefore increase rate-loss), it also has a dyadic distribution, which enables the use of a prefix code, which allows the use of a binary address for each composition without any additional rate loss. The problem of encoding and decoding to and from an arbitrary number of sequences with bounded energy can therefore be reduced to two independent algorithms: selecting a composition with appropriate energy and frequency; selecting the appropriate permutation of the desired composition.

This realization allows different embodiments to combine distribution matching with different sets of compositions, with the probability of selection of different compositions, to achieve the design flexibility of transmission with an overall distribution which approximates that determined by the ideal sphere bound.

Figure 1C:
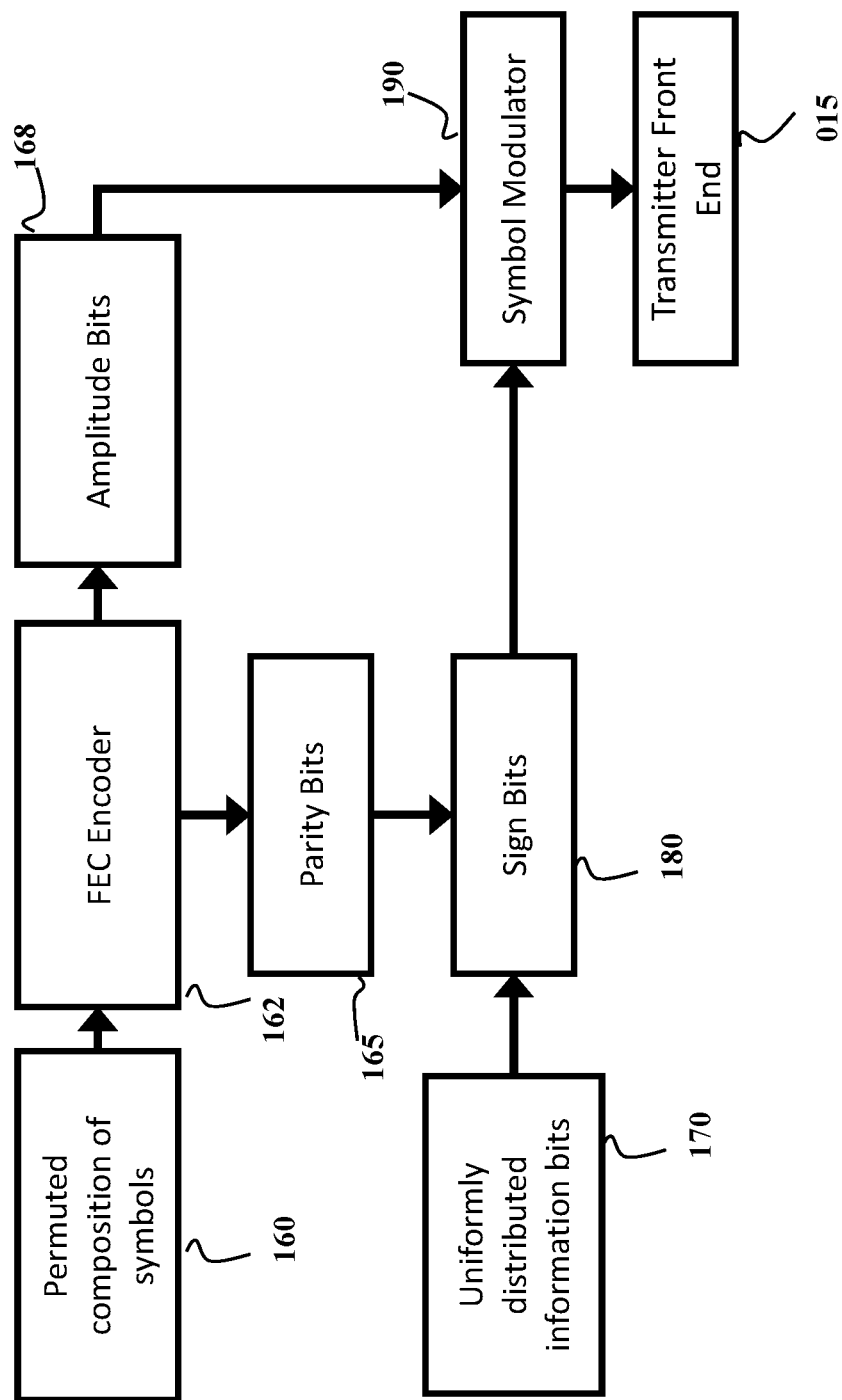
FIG. 1C shows a block diagram of the encoder and modulator according to some embodiments.

FIG. 1C shows a block diagram of the encoder and modulator according to some embodiments. An FEC encoder (162) is used to generate uniformly distributed parity bits (165) from blocks of shaped bits (160) with non-uniform distribution, and combine the parity bits in a modulator (190) with the bits of the blocks of shaped bits (160). According to some embodiments, at least some of the parity bits (165) are sign bits (180). Some of the sign bits (180) may optionally be composed of uniformly distributed information bits (170).

For example, according to some embodiments, the modulator (190) modulates the sequence of the blocks of shaped bits (160) onto amplitude bits (168) of QAM symbols, with at least some of the sign bits being determined by the uniformly distributed parity bits (165). A digital signal processor (DSP) (not shown) can be also used for processing the modulated sequence of the blocks of shaped bits for analog transmission over the communication channel using the transmitter front end 015.

Some embodiments are based on realization that for any given alphabet, there is a finite set of unique compositions of symbols of that alphabet that can be used by distribution matchers to map input bits into output symbols. Each composition can have a number of permutations, such that each composition can be used to transform a number of blocks of input bits equal the number of permutations. Each composition has an energy determined by the energy of transmission of the symbols of the composition. All permutations of the same composition have the same energy.

Figure 2A:
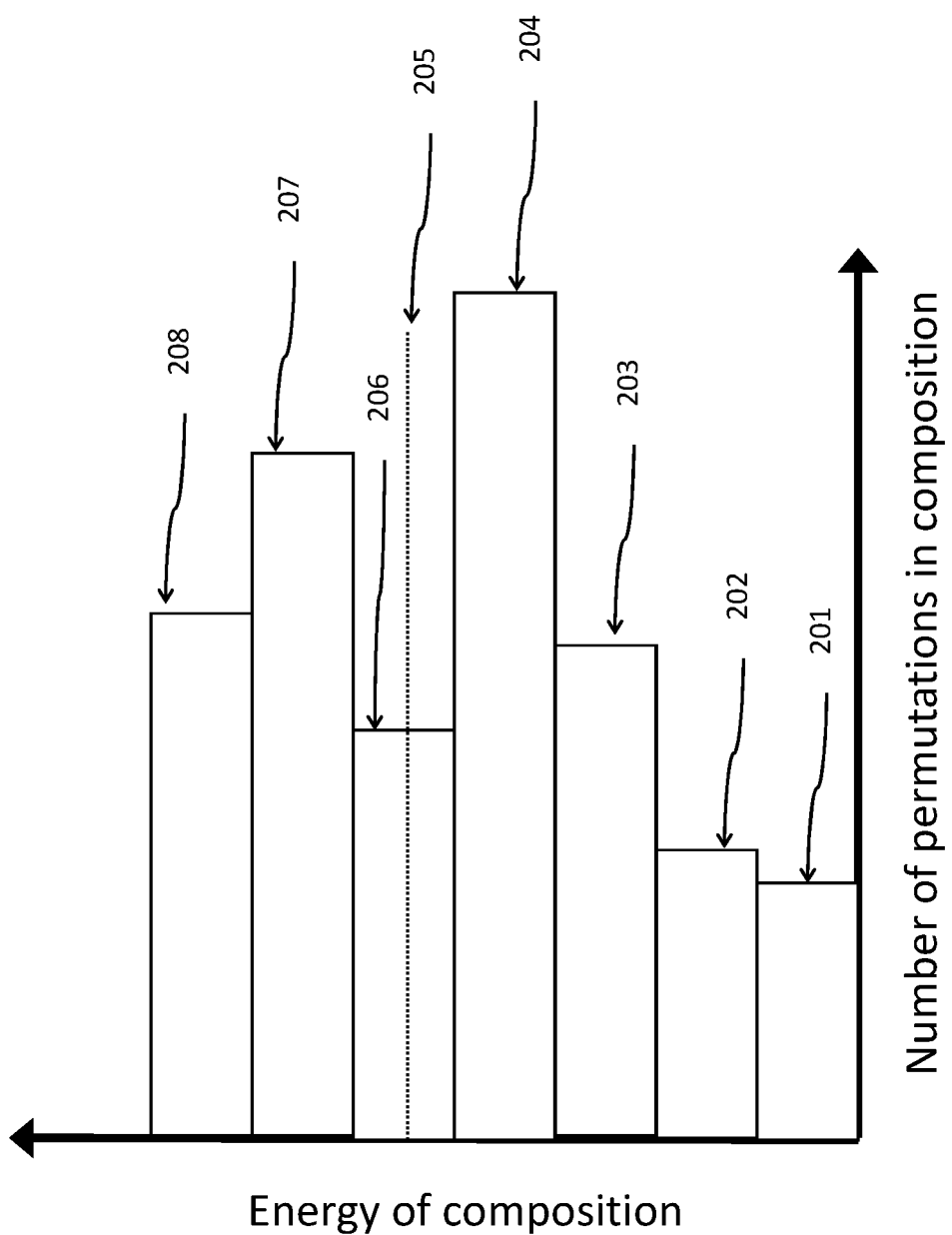
FIG. 2A shows a schematic demonstrating the concept of bounded energy used by some embodiments.

FIG. 2A shows a schematic demonstrating the concept of bounded energy used by some embodiments. FIG. 2A shows a set of compositions listed with increasing energy per composition. For example, starting from the lowest energy, a block (201) signify all possible permutations in the compositions (201), then the blocks (202), (203), (204) signify compositions with increasing energy and their permutations. Some embodiments select a desired number of the compositions and their permutations for a set of distribution matchers with energy below an energy bound 205. In theory, when the energy bound is reached (205), and a number of permutations equal to a number of possible combinations of the input bits, there is no need to add more compositions and their permutations in the distribution matcher. To that end, the energy bound 205 is selected such that a number of all possible permutations of low-energy compositions with energies below or equal to the energy bound is equal or greater than a number of all possible variations of values of bits in the input block of bits.

In example of FIG. 2A, the compositions 201, 202, 203, and 204 and their permutations are selected for the distribution matcher as well as at least some permutations of a composition (206). Other compositions with higher energy (207, 208) are not included in the distribution matcher. In this example, the compositions 201, 202, 203, 204, and 206 are low-energy compositions with energies below or equal to the energy bound. In contrast, the compositions 207 and 208 high-energy compositions with energy above the energy bound.

Figure 2B:
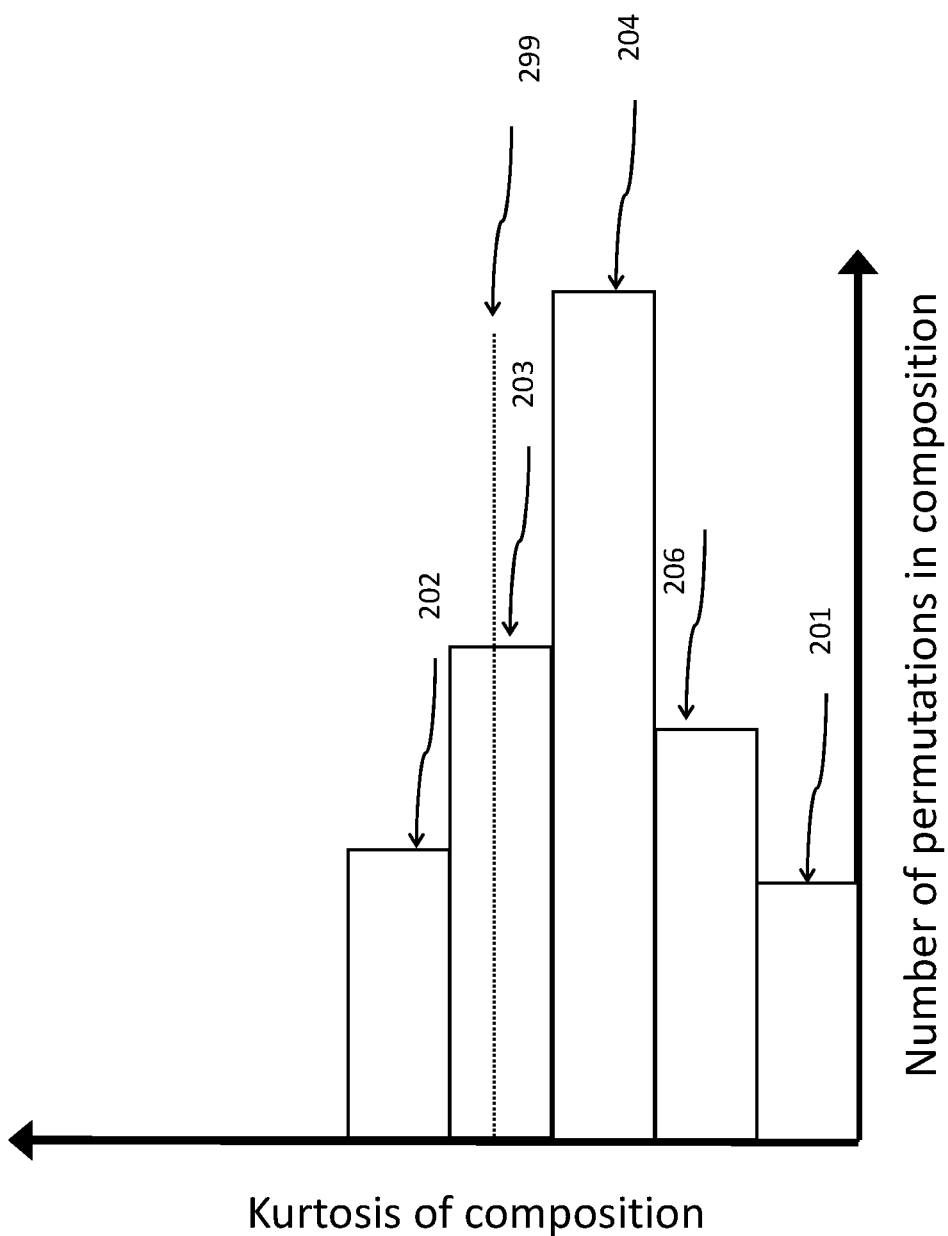
FIG. 2B shows a schematic demonstrating the concept of bounded kurtosis used by some embodiments.
Figure 2C:
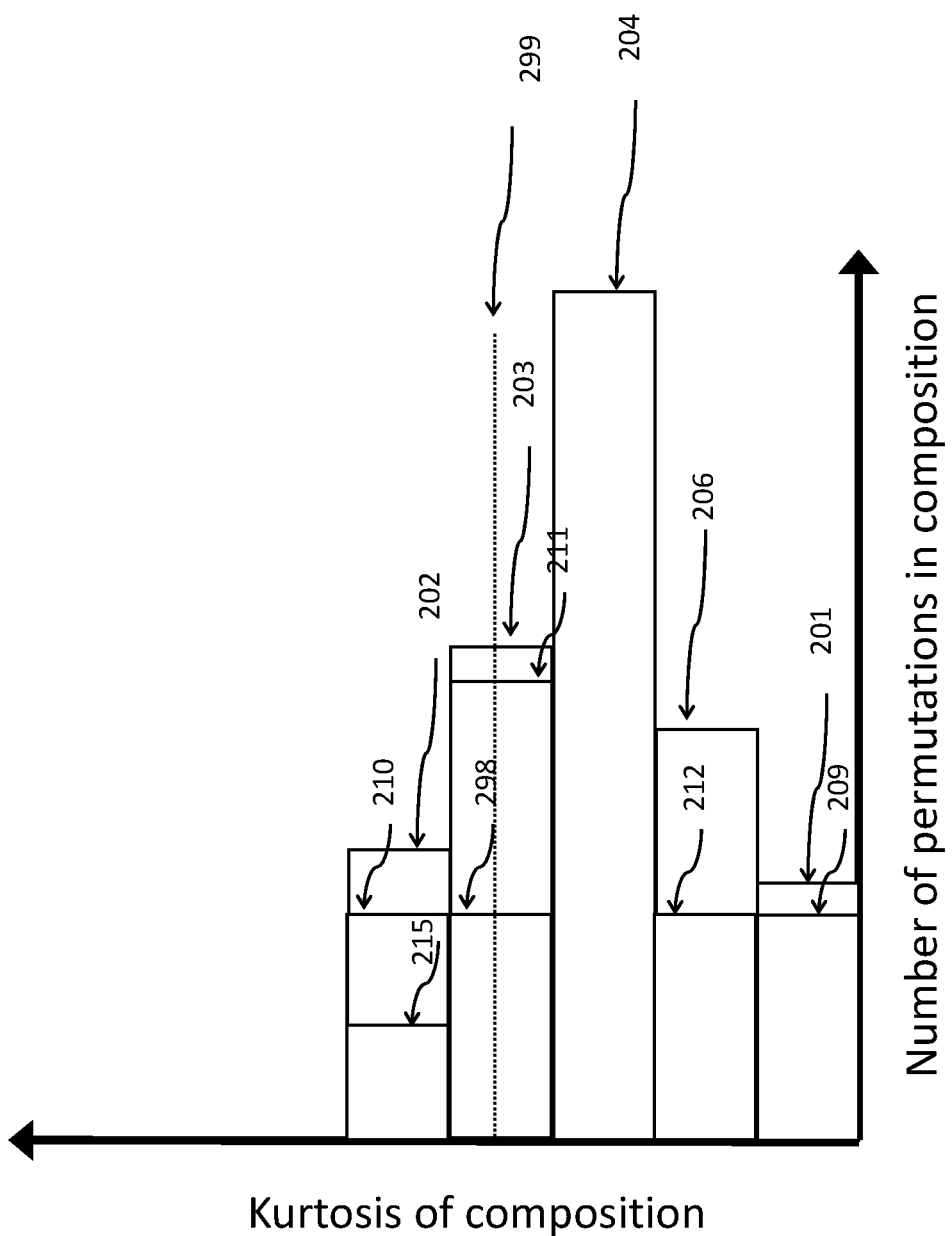
FIG. 2C shows a schematic demonstrating the reduction of permutations required to construct a dyadic distribution of compositions when bounded by energy according to some embodiments.

FIG. 2B shows a schematic demonstrating the concept of sorted kurtosis and bounded energy used by some embodiments. FIG. 2B shows a set of compositions which are defined as energy bound in FIG. 2A. The set of compositions 201, 202, 203, 204 and 206 are sorted according to their individual kurtosis, and a desired total number of permutations is bounded by a maximum kurtosis (299).

Some embodiments are based on the realization that in the case of the optical fiber channel, transmission performance is jointly determined by the average energy, and the average kurtosis of the signal distribution. Accordingly, by jointly optimizing the transmitted signal according to its average energy and kurtosis, embodiments are able to indirectly optimize the transmission performance.

Other embodiments are based on the realization that in some cases, the effective signal to noise ratio (SNR) after transmission in the optical fiber channel may be described as a function of the second, fourth, and sixth statistical moments of the signal, and certain constants which can be derived from the physical properties of the specific optical fiber link under consideration, see, e.g., "On probabilistic shaping of quadrature amplitude modulation for the nonlinear fiber channel," T Fehenberger, A Alvarado, G Böcherer, N Hanik, IEEE Journal of Lightwave Technology, 2016.

Armed with this understanding some embodiments, select compositions in the, dyadic distribution of compositions to reduce one or combination of energy and kurtosis of transmission. For example, by including all permutations with energy lower than that specified by the energy bound (205), the set of included permutations provides the maximum number of sequences for an average energy given the per-dimension cardinality. By including a maximum kurtosis (299), we are able to maximize the total number of permutations in the distribution matcher for specified bounds in energy and kurtosis. Hence, the resulting distribution matcher having all these permutations is Pareto optimal in the sense of having the lowest possible rate-loss at a given average energy, kurtosis and sequence length, for a specified per-dimension cardinality of a block of input bits.

For example, a composition C may be described as a multiset C={a, a, a, a, b, b, b, c, c, d} where a, b, c and d are different symbols. The cardinality of this multiset is 10. Unique permutations of this multiset may be transmitted as symbols, and represent a number of bits. The maximum number of bits k that can be transmitted over a sequence of length N with distribution X is the entropy bound $H(X) >= k/N$.

Some of the embodiments are based on the realization that approximating the distribution matcher as shown in FIGS. 2A and 2B may lead to near optimal rate-loss, and therefore near optimal performance.

Furthermore, some embodiments are based on the realization that by imposing a structure on the sphere-bound distribution matcher, simplified encoding and decoding may be realized at the penalty of some small amount of rate-loss. For example, if the distribution of the number of permutations in each composition is dyadic, communication system may use a Huffman code without additional loss to select a composition, and then use encoding and decoding techniques for constant-composition distribution matching (CCDM).

FIG. 2B shows a schematic of constricting a prefix tree with a dyadic distribution of compositions according to one embodiment. The entire set of compositions is again listed in order of kurtosis. For each composition, the embodiment rounds down the number of permutations (201, 206, 204, 203, 202) to the nearest power of two, to determine a maximum number of permutations given a dyadic distribution (209, 212, 211, 210). It is noted that in some cases, the number of permutations may not be adjusted (204), as it already is a power of two. Entire compositions are selected from the lowest energy first, counting the number of permutations in the dyadic approximation, until a maximum number of total permutations is reached (299). In this case, remaining number of permutations after selecting entire compositions is not (in general) a power of two. As every composition must have a power of two, we may select smaller powers of two for the remaining permutations (215, 298) such that the total number of permutations is correct, and the number of permutations in each composition is also a power of two, thus forming a dyadic distribution.

For example, the composition C={a,a,a,a,b,b,b,c,c,d} has a total number of unique permutations given by it's multinomial coefficient $P_{max}=10!/(4!3!2!1!)=12600$. The embodiment can round this number down to the nearest power of two to determine the maximum number of permutations permissible in a dyadic distribution, $P_{dyadic}=8192$. The permutations of this composition may be considered as having some ordering corresponding to, for example, the lexicographical ordering. This enables the mapping of an integer or a number of bits onto a unique sequence. For example in a lexicographical ordering, the first sequence is {a,a,a,a,b,b,b,c,c,d}; the second is {a,a,a,a,b,b,b,c,d,c} and so on, until the final sequence {d,c,c,b,b,b,a,a,a,a}.

To that end, some embodiments select a number of possible permutations for each composition as a power of two resulting in the minimum total energy of the selected permutations of the compositions. By having a number of permutations for each composition as a power of two allows us to use the Huffman code to map at least a part of a codeword to a composition in a set of possible compositions without rate loss. The remaining part of the codeword is optionally used to select a permutation within the composition.

FIGS. 2D and 2E show tables with a number of permutations in a composition (230), and the number of bits required by the Huffman code to select the specified composition (240), given a total distribution matcher size of $2^N$ unique sequences according to some embodiments. Notably, while this structure includes all compositions within the sphere bound, it may lead to an excessively deep Huffman tree. For example, some implementations limit the depth of the Huffman tree to p layers (equivalent to p bits maximum Huffman coding) as shown in FIG. 2D (260), by considering only permutations with more than $2^{(N-p)}$ permutations (250). This may reduce implementation complexity at the cost of a small rate loss.

Additionally, or alternatively, some embodiments in this invention are based on the realization that by removing compositions from the distribution matcher that have relatively few permutations, there is a relatively small impact on the statistical distribution of the distribution matcher, and therefore, a relatively small impact on the rate-loss of the distribution matcher. This is advantageous for implementation, as the distribution matching encoder/decoder can be simplified, as they do not have to account for unlikely compositions with additional arithmetic and/or electronic circuitry. To that end, in some embodiments, all compositions in the dyadic distribution of compositions identified by the prefix map are the low-energy compositions having a number of permutations of power of two greater than a permutation threshold.

Figure 3:
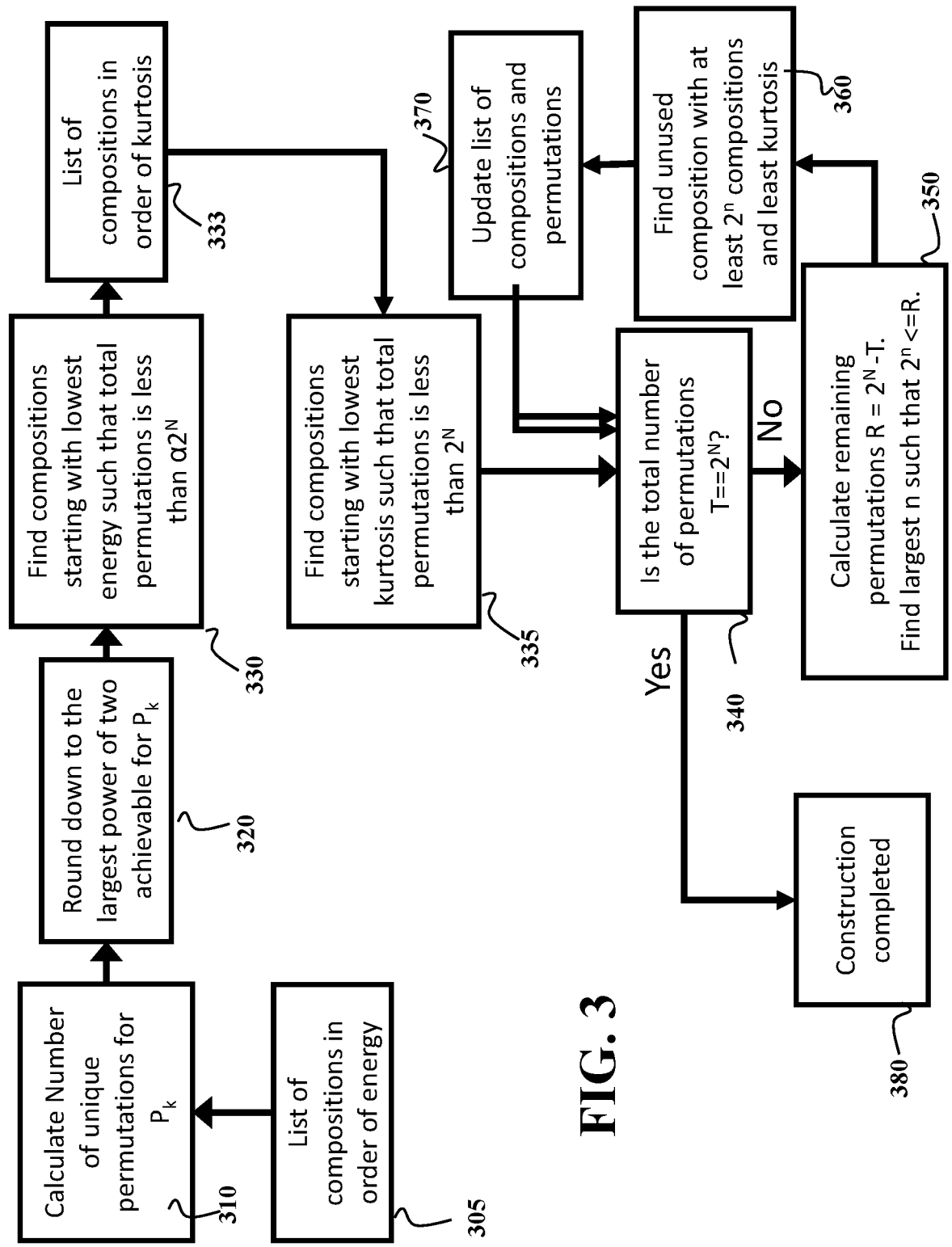
FIG. 3 shows a schematic of the method for constructing a prefix map that maps a dyadic distribution of compositions of output symbols to prefixes of variable lengths according to some embodiments.

FIG. 3 shows a schematic of the method for constructing a prefix map that maps a dyadic distribution of compositions of output symbols to prefixes of variable lengths according to some embodiments. A list of compositions is ordered in energy (305) includes symbols with frequency of occurrence defined by the compositions, and a number of symbols equal to a number of symbols in the block of the shaped bits.

The number of permutations of each composition on the list (305) is then calculated, to generate a corresponding list of numbers of unique permutations (310) of symbols with a total number of symbols in each subset equal to the number of symbols in the block of the shaped bits, wherein the distribution of symbols in each composition is defined by the list (305) of symbols. The maximum number of permutations of symbols for each generated composition determined by the highest pair of two (320) that is less than or equal to multinomial coefficients determined by the number of occurrences of each symbol in the subset, calculated in (310). A number of compositions is determined starting with the lowest energy such that the total number of permutations is less than a certain number (330). The set of compositions is then sorted and listed in order of their kurtosis (333), to form a binary tree.

For example, a binary tree may be constructed for a set of compositions that have frequencies $\{½, ¼, ⅛, ⅛\}$. Since this distribution is dyadic, it is possible to construct a prefix code which achieves the entropy bound (i.e., a Huffman code), in order to address these compositions. An example of such a code is the set of prefixes $\{0, 10, 110, 111\}$ occupying $\{1, 2, 3, 3\}$ bits, respectively. In a fixed length distribution matcher, we may use this variable-length prefix to determine the composition which is selected, while using the remaining bits, also of variable length, to select a unique permutation within the composition. In the example above, if a 10 bit word is used, and the first $\{1, 2, 3, 3\}$ bits are used for encoding the location of the composition n in the binary tree, then the number of remaining bits is respectively $\{9, 8, 7, 7\}$, and the number of unique permutations for each composition addressed in such a system is therefore $\{512, 256, 128, 128\}$.

Starting with the compositions with the lowest energy, entire compositions are then selected for the distribution matcher, such that the total number of permutations is less than or equal to $2^N$ (335). When this selection procedure is finished, there may be additional compositions required to complete the dyadic distribution for a fixed block length. The total number of permutations in the distribution matcher is calculated (340). If it is equal to $2^N$, the construction is completed (380). If it is not completed, the number of remaining permutations $R=2^N-T$ is calculated, and the largest n such that $2^n<=R$ is found (350). The unused composition with at least $2^n$ permutations and least energy is then selected (360), and a set of $2^n$ permutations selected from this composition. The list of remaining compositions and permutations is then updated (370), and the stopping criterion is then checked again (340).

For example, the length of the input block of bits defines an energy bound which is a minimum energy allowing a number of compositions having a number of permutations sufficient to encode the input block of bits and having energy not greater than the energy bound. To consider both the energy and kurtosis, the dyadic distribution of compositions of some embodiments include at least one composition with energy greater than the energy bound that replaces in the dyadic distribution a composition with energy below the energy bound but having a kurtosis above a threshold.

By considering both the energy and the kurtosis, some embodiments select the compositions in the dyadic distribution to have a minimum total energy for a total kurtosis. In other words, for a given total kurtosis, the energy of the compositions is minimized. Similarly, some embodiments select the compositions in the dyadic distribution to have a minimum total kurtosis for a total energy. In other words, for a given total energy, the kurtosis of the compositions is minimized.

Some embodiments are also based on recognition that in the optical communication when the communication channel is an optical fiber channel, a total energy of the compositions in the dyadic distribution is a second statistical moment of transmission over the optical fiber channel and a total kurtosis of the compositions in the dyadic distribution is a fourth statistical moment of the transmission over the optical fiber channel. The compositions depend on these second and fourth statistical properties as well as on a sixth statistical moment of the transmission of the optical fiber channel referred herein as a hypertailedness. To that end, some embodiments select the compositions in the dyadic distribution to maximize a function relating a signal to noise ratio (SNR) of the optical fiber channel to the total energy, the total kurtosis, and the hypertailedness. The parameters of the function are properties of the optical fiber channel. For example, the function is an extended Gaussian noise model of the optical fiber channel.

In effect, the prefix tree allows to simplify matching and dematching process between input blocks of bits and output symbols with non-uniform distribution. In addition, the composition selected with respect to the energy bound and kurtosis allows to reduce rate loss of transmission. In combination, the prefix tree and the consideration of the energy bound and kurtosis simplify the transmission process allowing to reduce complexity of the hardware of communication system while reducing the rate loss of the transmission.

Figure 4A:
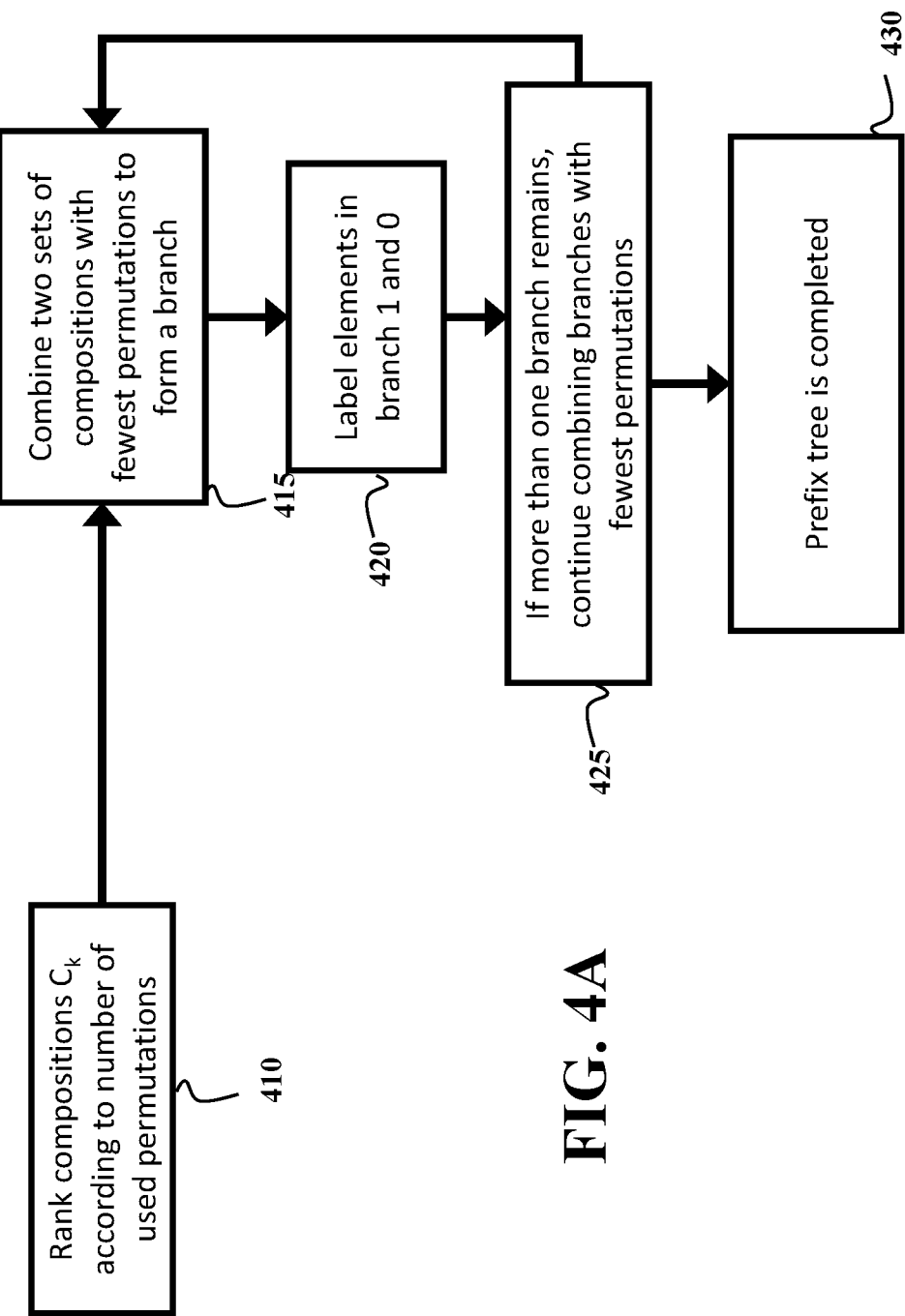
FIG. 4A shows a block diagram of a method for generating a tree structured variable length header to provide bit-labels for the different partitions according to some embodiments.

FIG. 4A shows a block diagram of a method for generating a tree structured variable length header to provide bit-labels for the different partitions according to some embodiments. The different compositions are ranked according to their associated number of permutations (410). The two compositions with the fewest total number of permutations are then merged to form a branch (415), with one element labeled 1 and the other 0 (420). If more than one branch remains, the merging and labeling process is repeated (425). When only a single branch remains, the prefix tree is completed (430).

Figure 4B:
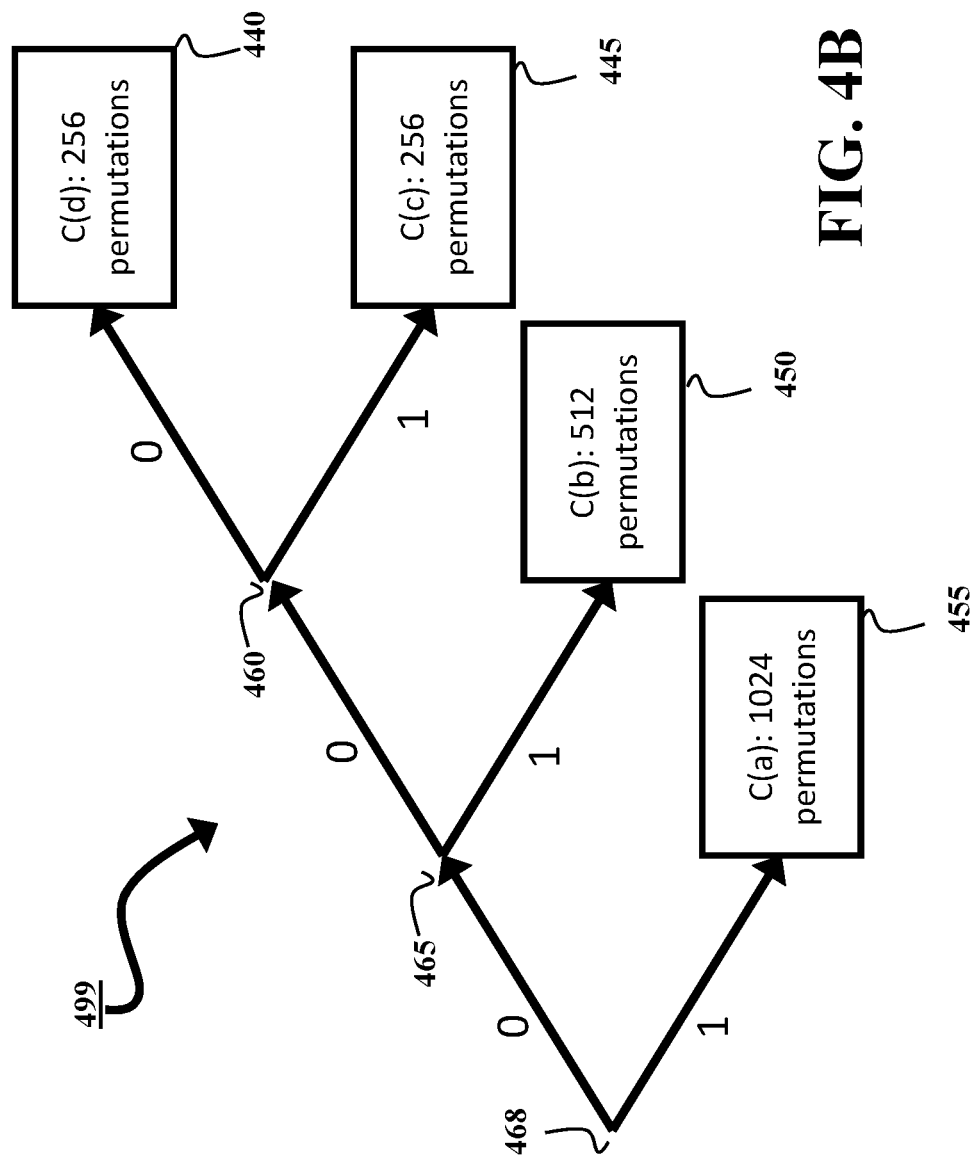
FIG. 4B shows a schematic of exemplar prefix tree used by some embodiments for selecting a composition according to a variable length prefix.

FIG. 4B shows a schematic of exemplar prefix tree used by some embodiments for selecting a composition according to a variable length prefix. During an operation of communication system according to some embodiments, the prefix tree 499 is stored in a memory 130. Leafs (440), (445), (450), (455) of the prefix tree are associated with the compositions. The composition is selected using the prefix bits as read from the first node in the tree (468). At each node in the tree (468), (465), (460), a bit in the prefix is used to select one of the branches available according to the bit label of the branch. This process is repeated until one of the leaves is reached.

It is noted that by using this construction, the number of bits in the prefix added to the number of bits represented by the number of permutations in each leaf is constant, and equal to the input bit block length. Specifically, a prefix tree is a full binary tree such that every node has two children and each branch is associated with either 0 or 1 value, such that a path from a root node 468 to each leaf (440), (445), (450), (455) is defined by unique sequence of binary value referred herein as a prefix or prefix code or Hufmann code. Each leaf of the prefix tree is associated with a composition. The compositions in the prefix tree can be unique or can have multiple occurrences. Various source coding techniques such as those described herein can be used to determine an optimal labeling for the prefix for a variable length prefix.

The prefix tree 499 stores a dyadic distribution of compositions such that a probability mass function of each composition in the dyadic distribution is two in a power of −N. By way of construction, each composition is represented in the dyadic distribution of compositions with power of two numbers of its permutations. In addition, a total number of permutations in the dyadic distribution of compositions should also be a power of two.

In cases when each composition in the prefix tree have a unique occurrence, each leaf in the prefix tree is associated with a composition that have at least a number of unique permutations equals two in a power of a length of a suffix defined by a difference between the length of the block of input bits and the length of the prefix defined by the depth of the leaf. For example, the depth of the leaf 440 is three and the path to the leaf 440 is {000}. Similarly, the depth of the leaf 445 is three and the path to the leaf 440 is {001}. When the first three bits in the input block of bits are {000}, the leaf 440 is selected, such that the length of the suffix is 8 when the length of the input block of bits is 11. Two in a power of eight gives 256 possible permutations. Hence, the composition associated with the leaf 440 has at least 256 possible permutations according to some embodiments.

Note, that the depth of leaf 455 is one leaving 10 bits to the suffix to permute the combination associated with the leaf 455. To that end, the combination associated with leaf 455 has at least 1024 permutations according to some embodiments. Note, that permutations of leaf 455 can be in theory used for the leaf 440. However, if the composition of the leaf 440 does not have 1024 unique permutations, such a composition cannot be associated with the leaf 455.

Figure 4C:
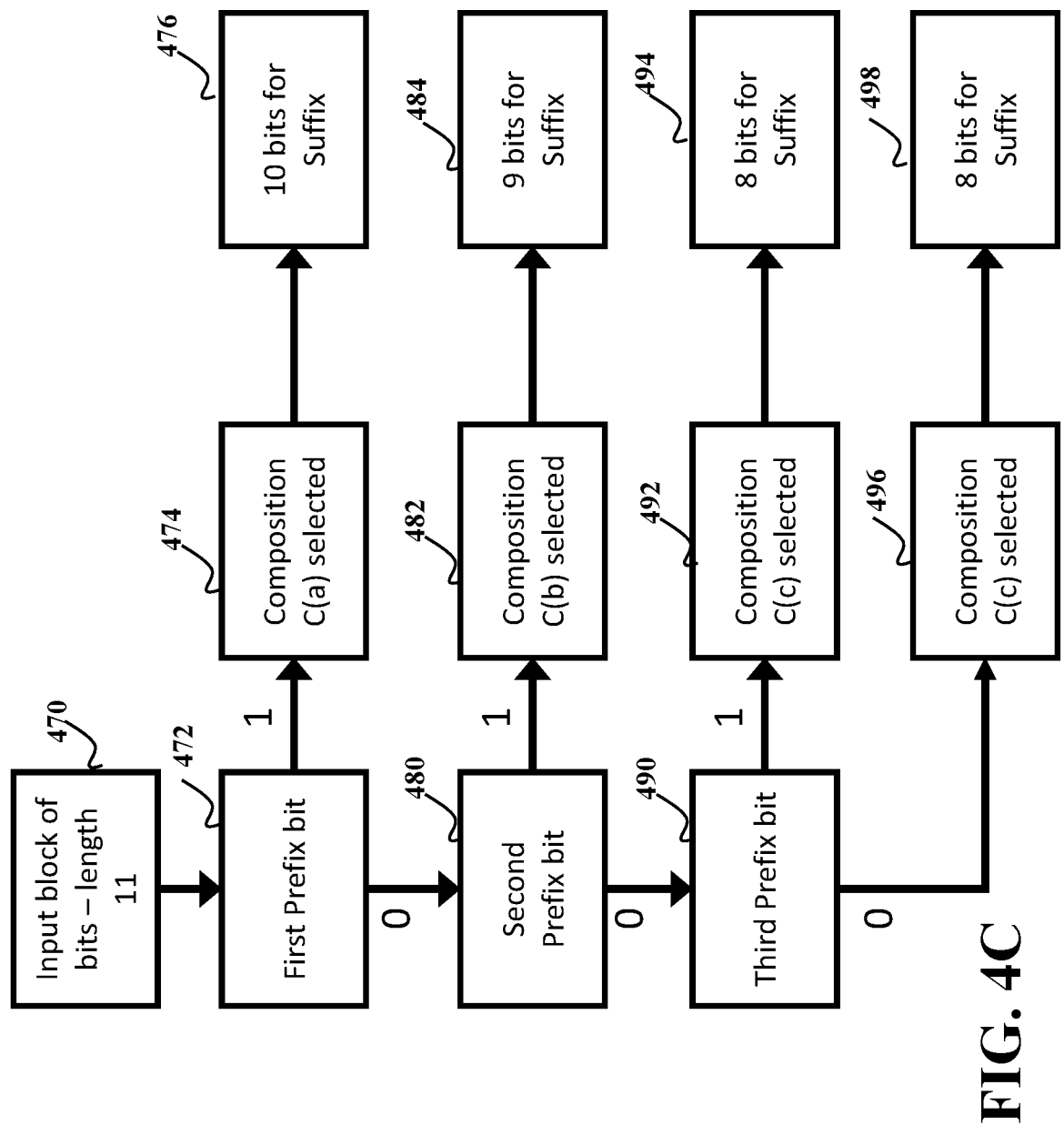
FIG. 4C shows a flow diagram for selecting a composition from a prefix map using a variable length prefix according to some embodiments.

FIG. 4C shows a flow diagram for selecting a composition from a prefix map using a variable length prefix according to some embodiments. An input block of 11 bits (470) is used as an input. The first bit in the prefix (472) is examined, if it has the value '1' a certain composition is selected (474) and the remaining 10 bits are used for the suffix (476). If the first prefix bit (472) has value '0', then the second prefix bit (480) must be examined. If it has the value '1' a certain composition is selected (482) and the remaining 9 bits are used for the suffix (484). If the second prefix bit (480) has value '0', then the third prefix bit (490) must be examined. If it has the value '1' a certain composition is selected (492) and the remaining 8 bits are used for the suffix (494). If the third prefix bit (490) has value '0', then a certain composition is selected (496) and the remaining 8 bits are used for the suffix (498).

In cases when the compositions in the prefix tree have multiple occurrences, each leaf is further associated with a rank offset, such that a combination of the composition with its rank offset is unique to the prefix tree. Each leaf in the prefix tree is associated with a rank offset, which is equal to the sum of power of two of the lengths of the suffixes of leafs of lower depth associated with the same composition.

Figure 5A:
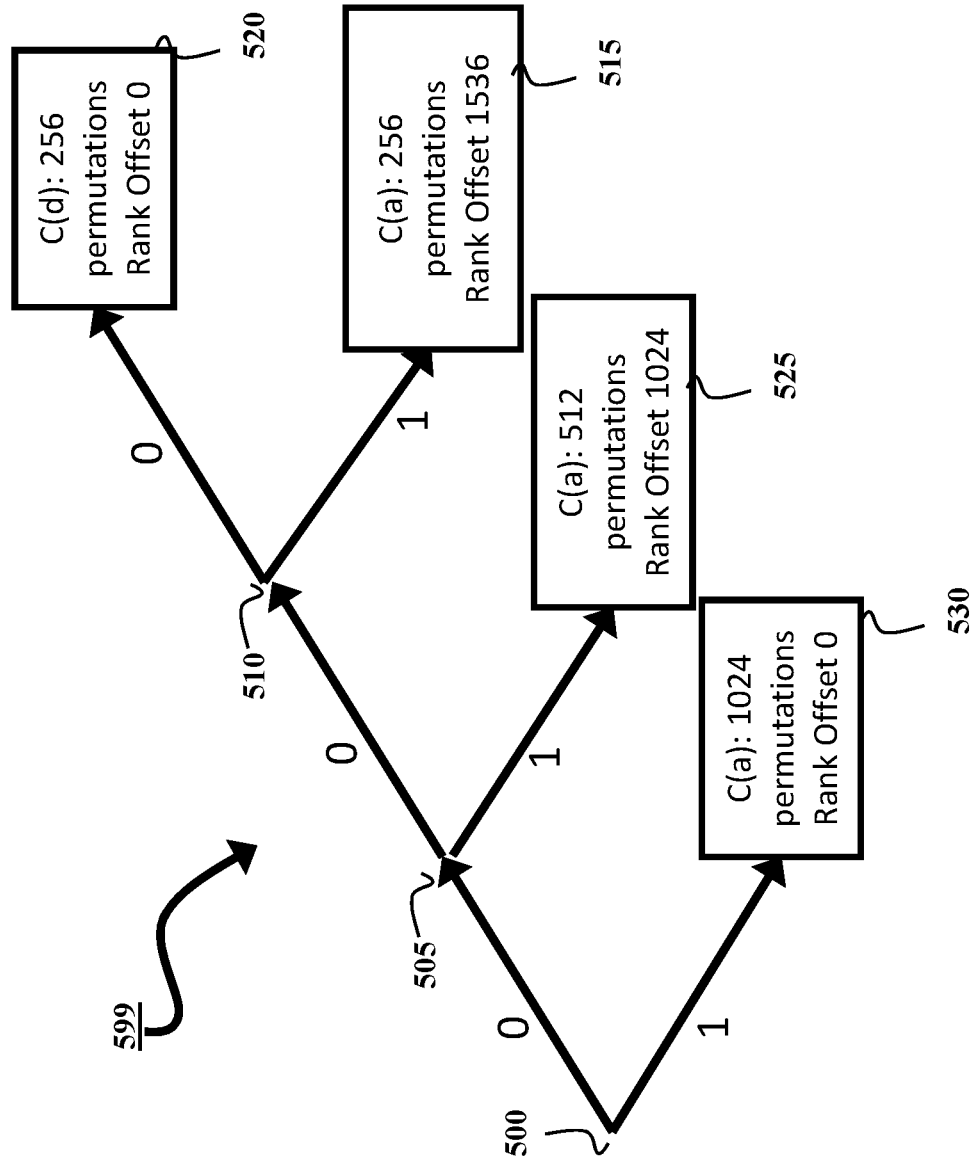
FIG. 5A shows a schematic of exemplar prefix tree used by some embodiments for selecting a leaf according to a variable length prefix, where several leaves share the same composition.

FIG. 5A shows a schematic of exemplar prefix tree used by some embodiments for selecting a leaf according to a variable length prefix, where several leaves share the same composition. During an operation of communication system according to some embodiments, a prefix tree 599 is stored in a memory 130. Leafs (530), (525), (515), (520) of the prefix tree 599 are associated with the each with a composition and a rank offset, the combination of which is unique. The leaf is selected using the prefix bits as read from the first node (500) in the prefix tree 599. At each node in the tree (500), (505), (510), a bit in the prefix is used to select one of the branches available according to the bit label of the branch. This process is repeated until one of the leaves is reached.

Each leaf in the prefix tree is associated with a rank offset, which is equal to the sum of power of two of the lengths of the suffixes of leafs of lower depth associated with the same composition. For example, the leaf 530 does not have leafs of lower depth associated with the same composition. Hence, the rank offset of the leaf 530 is zero. The leaf 525 has one leaf 530 of lower depth associated with the same composition. So the rank of set of the leaf 525 is power of two of the lengths of the suffixes of leaf 530, which is 1024 in this example. Similarly, the leaf 515 has two leafs 525 and 530 of lower depth associated with the same composition. The rank offset of the leaf 515 is the sum of power of two of the lengths of the suffixes of leafs 530 and 525, which is 1024+512=1536 in this example.

Figure 5B:
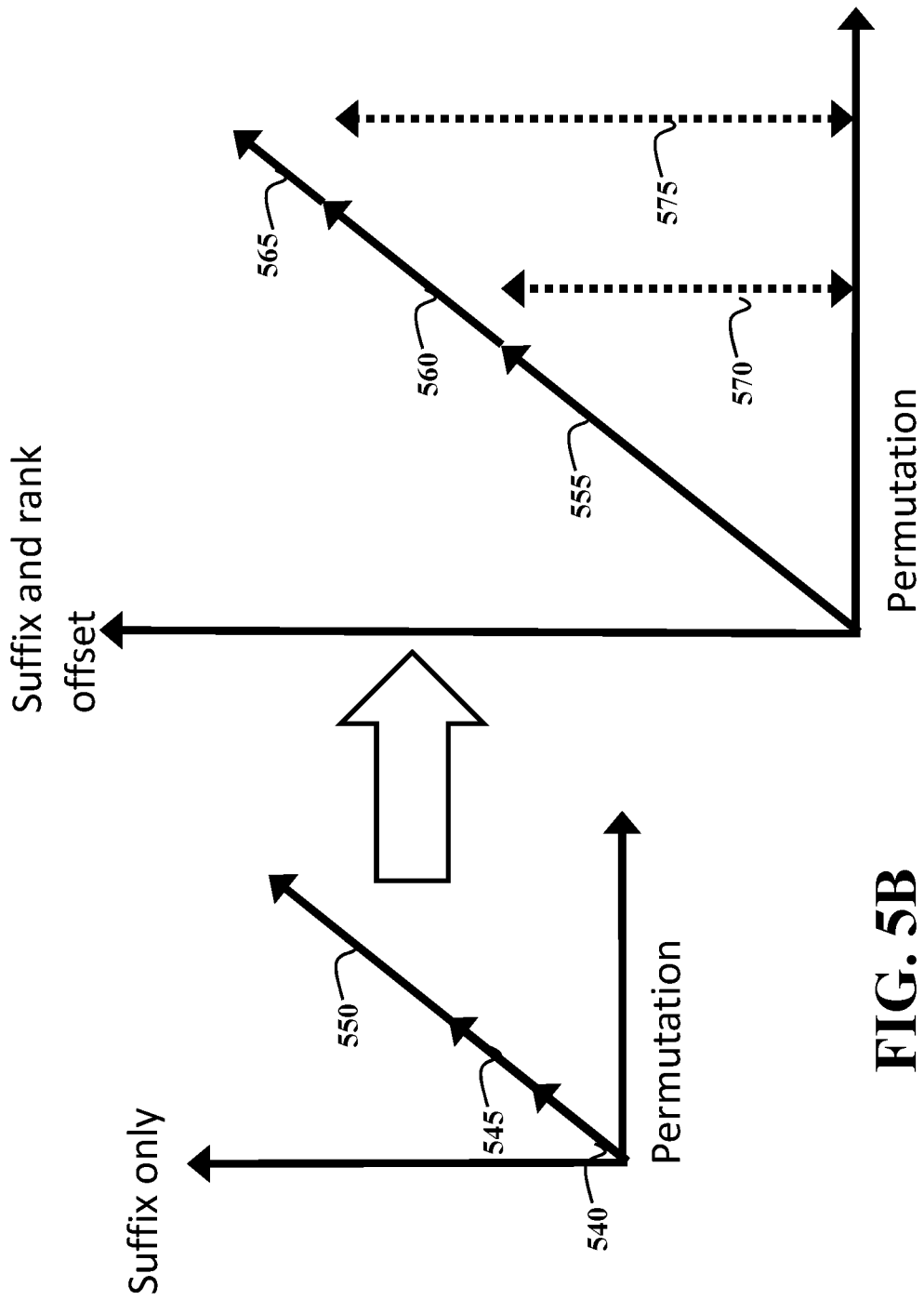
FIG. 5B shows a schematic of the rank offset permutation mapping used by some embodiments.

FIG. 5B shows a schematic of the rank offset permutation mapping used by some embodiments. In the exemplar prefix tree 599, leafs 515, 525, and 530 have different depth, but are associated with the same composition. A leaf 520 is associated with different and unique composition. Hence, if the mapping and/or permutation is performed using the suffix only, the permutation mappings of three leaves (540), (545), (550) are overlapping. In other words, the same suffix maps different leaves to the same permutation. When more than one possible input bit blocks can map to the same output, the mapping is no longer invertible, and the original input bit block may not be recovered with demapping. When the suffix is added to the rank offset, the permutation mappings of three leaves (555), (560), (565) are non-overlapping, as the permutations associated with the second and third leaves (560), (565) are shifted by their associated rank offsets (570), (575).

In effect, the duplication of compositions in the prefix tree 599 allows using low-energy compositions more efficiently to reduce the rate loss of transmission of a communication system according to some embodiments.

Figure 6:
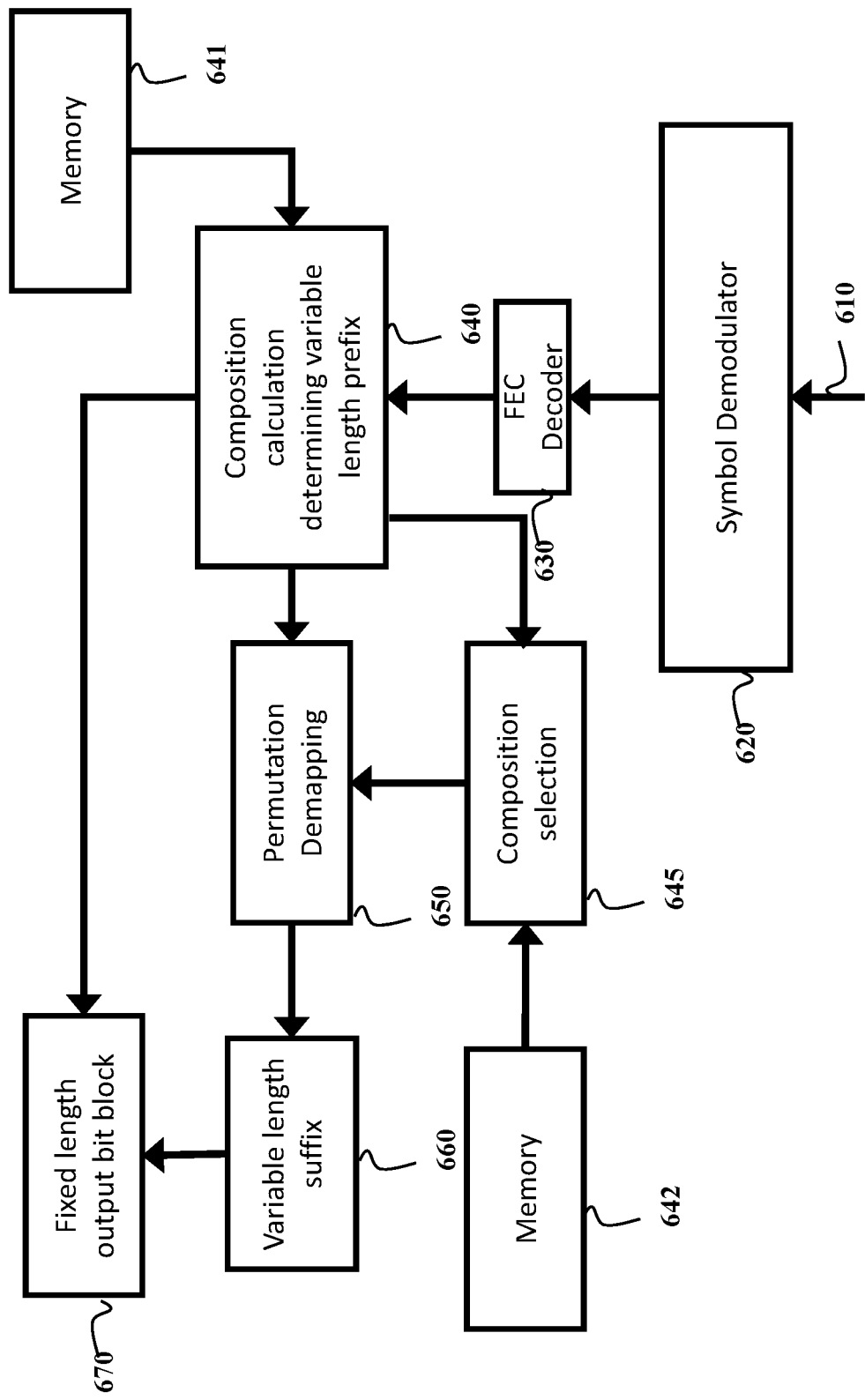
FIG. 6 shows a block diagram of a system for decoding and demodulating a fixed length sequence of symbols with amplitude shaping and forward error correction in a receiver, according to some embodiments.

FIG. 6 shows a block diagram of a system for decoding and demodulating a fixed length sequence of symbols with amplitude shaping and forward error correction in a receiver, according to some embodiments. A symbol sequence (610) is sent from the receiver front end, to a symbol demodulator (620), the output of which is then used in an FEC decoder (630). After decoding, the composition is calculated (640) according to data stored in memory (641), such that the prefix bits are determined. The selected composition (645), and associated data stored in memory (642) are used to perform permutation demapping (650) on the permutation, such that the variable length suffix (660) is determined. The variable length prefix and variable length suffix are then combined to produce the fixed length output bit block.

In some embodiments, the permutation mapper permutes the selected composition using at least two parallel binary mappings between at least two subsets of the input block of bits and at least two binary permutations of the composition, as described below. In such a manner, a parallelism is added to the permutations making the permutation process more efficient.

Figure 7:
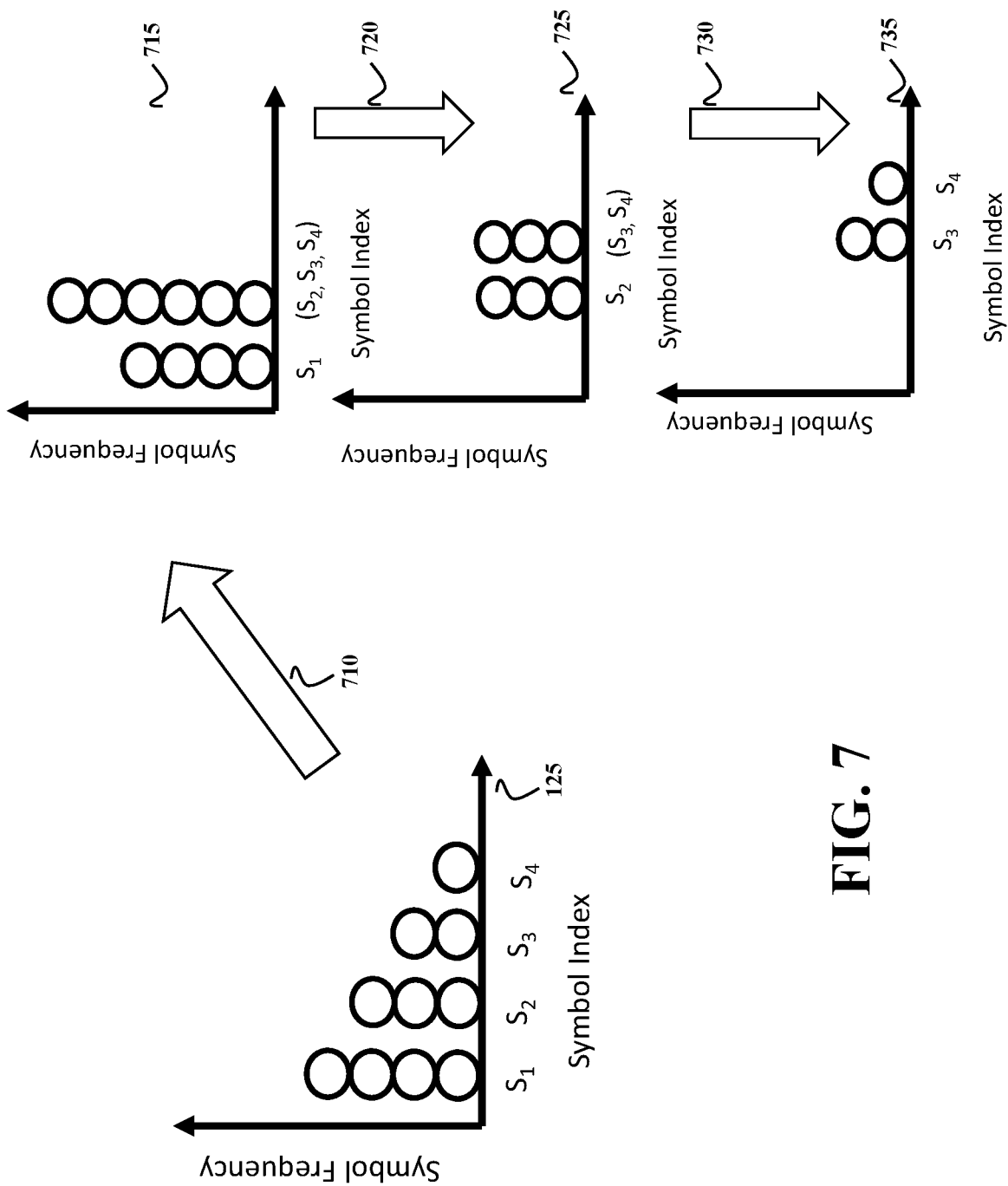
FIG. 7 shows a schematic of decomposition of a selected composition into several parallel binary compositions, suitable for subset ranking according to some embodiments.

FIG. 7 shows a schematic of decomposition of a selected composition 125 into several parallel binary compositions, suitable for subset ranking according to some embodiments. The subset ranking is used by some embodiments to perform the parallel binary mappings. For example, an initial composition (125) selected by the composition selector from the prefix tree with cardinality 4 can be decomposed (710) into a first binary composition (715), wherein the first element corresponds to the first symbol in the initial composition, and the second element corresponds to the combination of the other three symbols into a single element. The grouped element in the first binary composition (715) can be further decomposed (720) into a second binary composition (725), wherein the first element corresponds to the second symbol in the initial composition (125), and the second element corresponds to the combination of two symbols into a single element. The grouped element in the second binary composition (725) can be further decomposed (730) into a third binary composition (735), wherein the first element corresponds to the third symbol in the initial composition (125), and the second element corresponds to the fourth symbol in the initial composition.

An initial distribution with cardinality 4 (600) is decomposed (610) into a first binary distribution (615) comprising one element in the original distribution (600) and a second element representing all other elements. The second element in this binary distribution is further decomposed (620) into a new distribution (625) based on the second element in the previous distribution (615). The new distribution is a sub-distribution of the previous distribution (615) comprising the second element in the original distribution (600), and a second element comprising the combination of the third and fourth elements in the original distribution (600). The second element in this distribution (625) is again decomposed (630) into a final binary distribution (635), were the first and second elements are the third and fourth elements respectively in the original distribution (600).

In effect, having binary composition, as contrasted with the multiset of the selected composition, allows to break dependencies among symbols of the composition to permute different binary compositions independently from each other. In addition, due to subset ranking, some embodiments can demap the permuted composition in parallel as well.

Figure 8A:
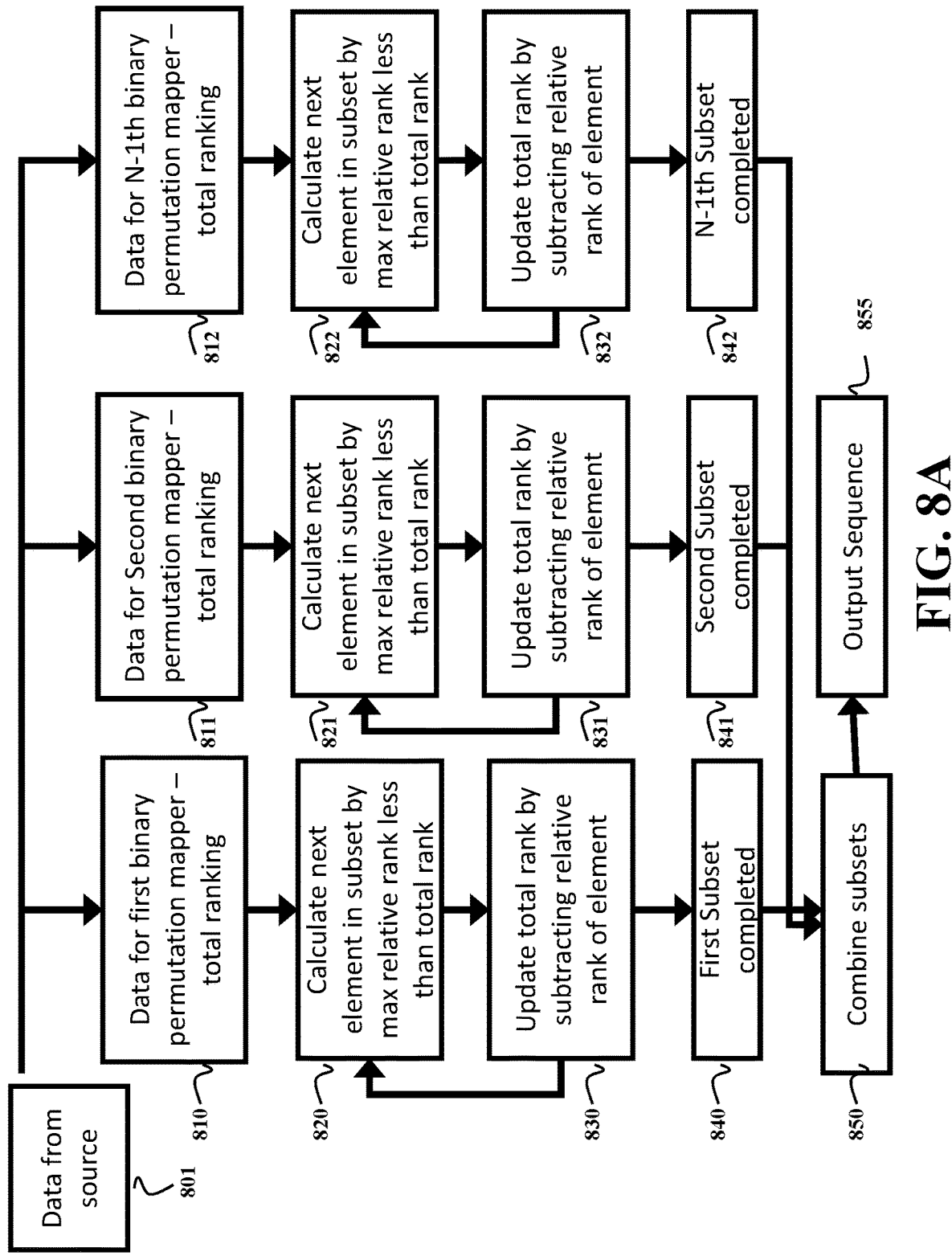
FIG. 8A shows a schematic of a permutation mapper using parallel binary permutation mappers and subset deranking according to some embodiments.

FIG. 8A shows a schematic of a permutation mapper using parallel binary permutation mappers and subset deranking according to some embodiments. Data from a source (801) such as suffix bits, is sent to a number of parallel permutation mappers, describing a total subset rank for each (810), (811), (812). A subset rank is defined by some ordering of all possible subsets, such as a lexicographic ordering. For example, in subsets of cardinality 5 drawn from the set of integers from 1 to 10, there are 10!/(5!5!) =252 possible subsets, and in lexicographical ordering the first of them is {1,2,3,4,5} and the last of them is {6,7,8,9, 10}. In each binary mapper, the next element in the subset is calculated (820), (821), (822) thus describing the position of one of the symbols being permuted. The total rank of each subset is updated by subtracting the relative rank of the element (830), (831), (832). A relative rank is defined as the total number of possible subsets with lower rank, while specifying only a single element in the subset. For example, when specifying the first element of a subset of cardinality 5 drawn from the set of integers from 1 to 10, we note that there are (10−x)!/((5−1)!(10−x−5+1)!) subsets with the first element less than x. These two steps are repeated until all elements in the subsets are determined (840), (841), (842). These subsets are then combined (850) to produce the output sequence (855).

Figure 8B:
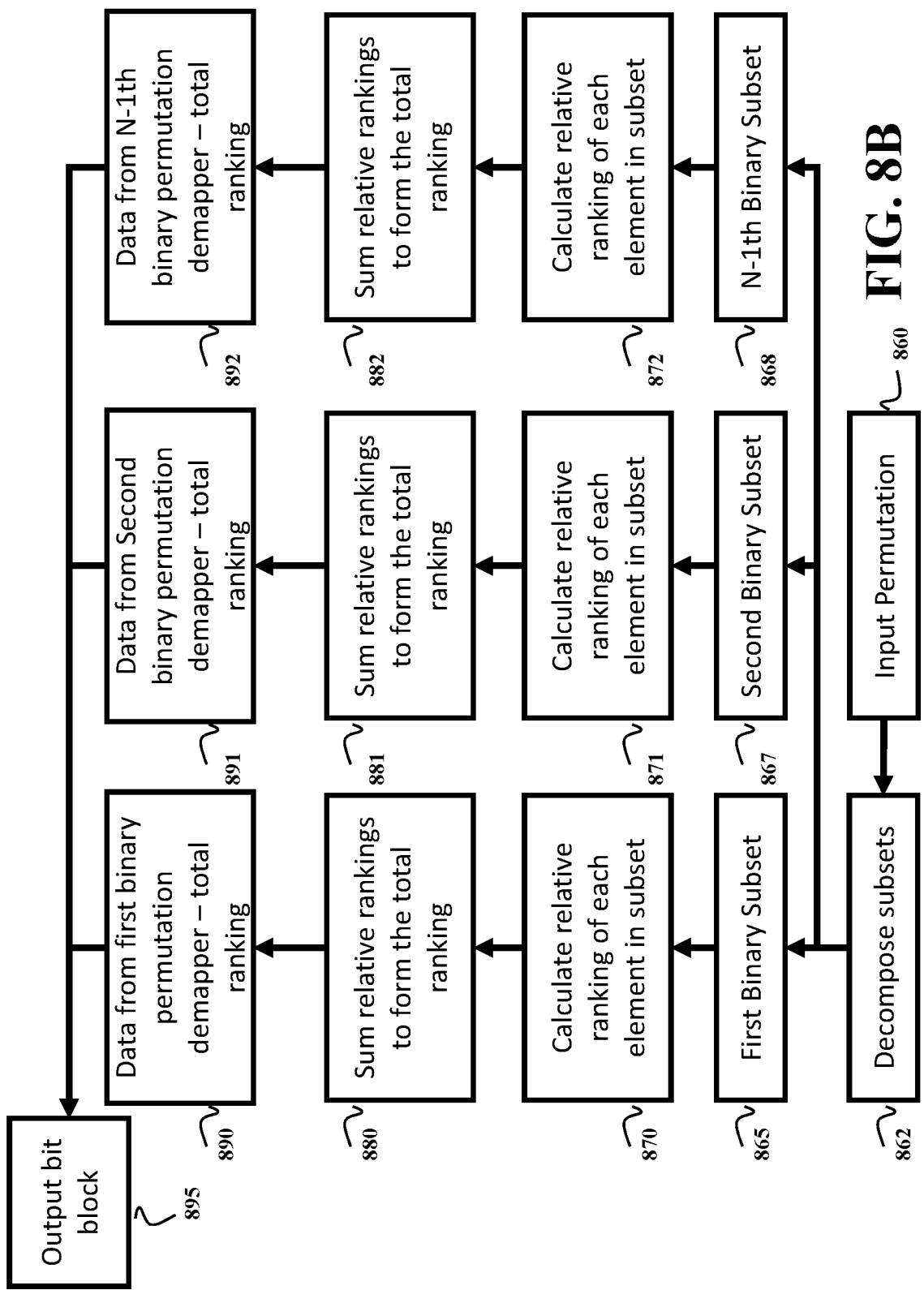
FIG. 8B shows a schematic of a permutation demapper using parallel binary permutation demappers and subset ranking according to some embodiments.

FIG. 8B shows a schematic of a permutation demapper using parallel binary permutation demappers and subset ranking according to some embodiments. An input permutation (860) is decomposed (862) into subsets. These parallel binary subsets (865), (867), (868) are then processed in parallel. The relative ranking of each possible element in each subset is calculated (870), (871), (872), and these relative ranks then summed to form the total ranking for each subset (880), (881), (882). The resulting data from these binary permutation demappers (890), (891), (892), is then combined to form the output bit block (895).

Additionally or alternatively, in one embodiment, the permutation mapper permutes the selected composition using an arithmetic coding for a constant composition distribution matching, wherein the suffix in the input block of bits is an input vector to the arithmetic coding. In effect, the arithmetic coding reduces the complexity of implementation of the permutation mapper with respect to using a lookup table while permuting the symbols of the composition serially.

FIG. 9A shows a schematic of permutation mapping using an algebraic encoding method for constant composition distribution matching according to one embodiment. Data is received from a source (901), and the next bit of the sequence is selected (905). Intervals are calculated according to the value of the bit (910), and the next symbols in the permutation are determined (915). The intervals are then rescaled (920), and if bits are remaining from the source (901), the next bit is selected (905). When the bits from the source (901) have all been processed, the permutation is complete (925). For exemplar implementation details of the algebraic encoding method for constant composition distribution matching, see e.g. Schulte, Patrick, and Georg Böcherer. "Constant composition distribution matching." IEEE Transactions on Information Theory 62.1 (2016): 430-434.

Figure 9B:
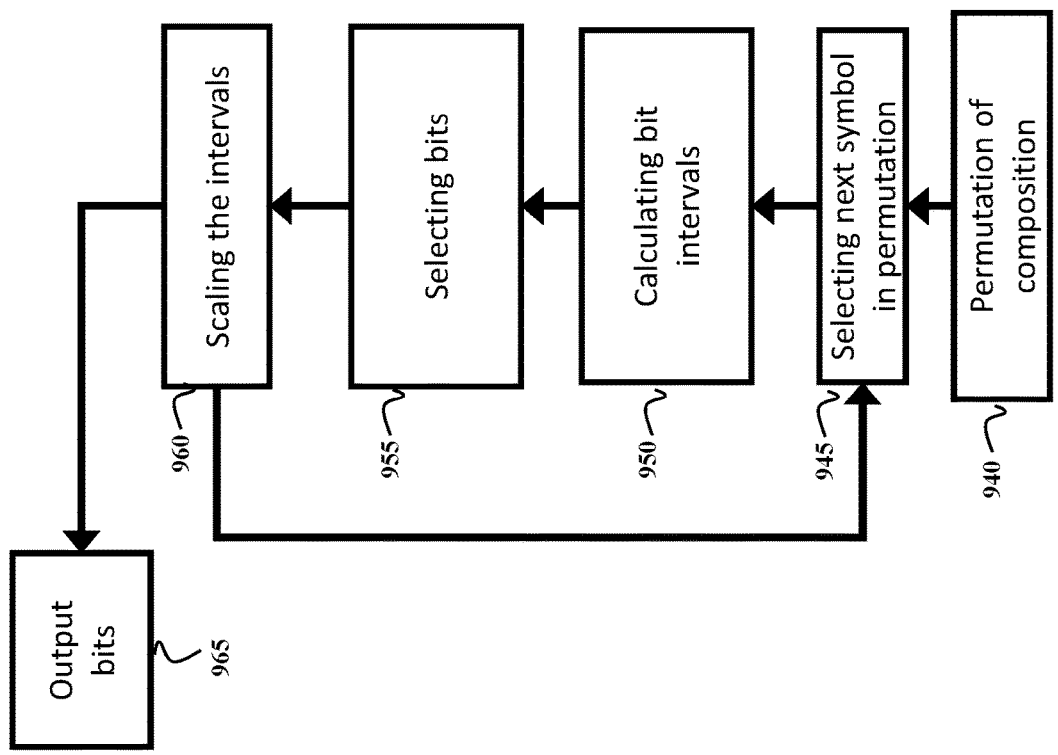
FIG. 9B shows a schematic of the permutation demapping using an algebraic encoding method for constant composition distribution matching according to one embodiment.

FIG. 9B shows a schematic of the permutation demapping using an algebraic encoding method for constant composition distribution matching according to one embodiment. A permutation of a composition is the input (940), and the symbols in the permutation are selected sequentially (945). Bit intervals are calculated (950), bits are selected (955) and the intervals are scaled (960). If symbols in the input permutation (940) remain, the next symbol is selected. When all symbols in the permutation have been processed, the bits are output (965).

Additionally or alternatively, in one embodiment, the permutation mapper permutes the selected composition using a multiset ranking mapping between the input block of bits and the permuted composition. In effect, the multiset ranking mapping allows to perform mapping and demapping using integer arithmetic, which is advantageous for electronic circuits.

Figure 9C:
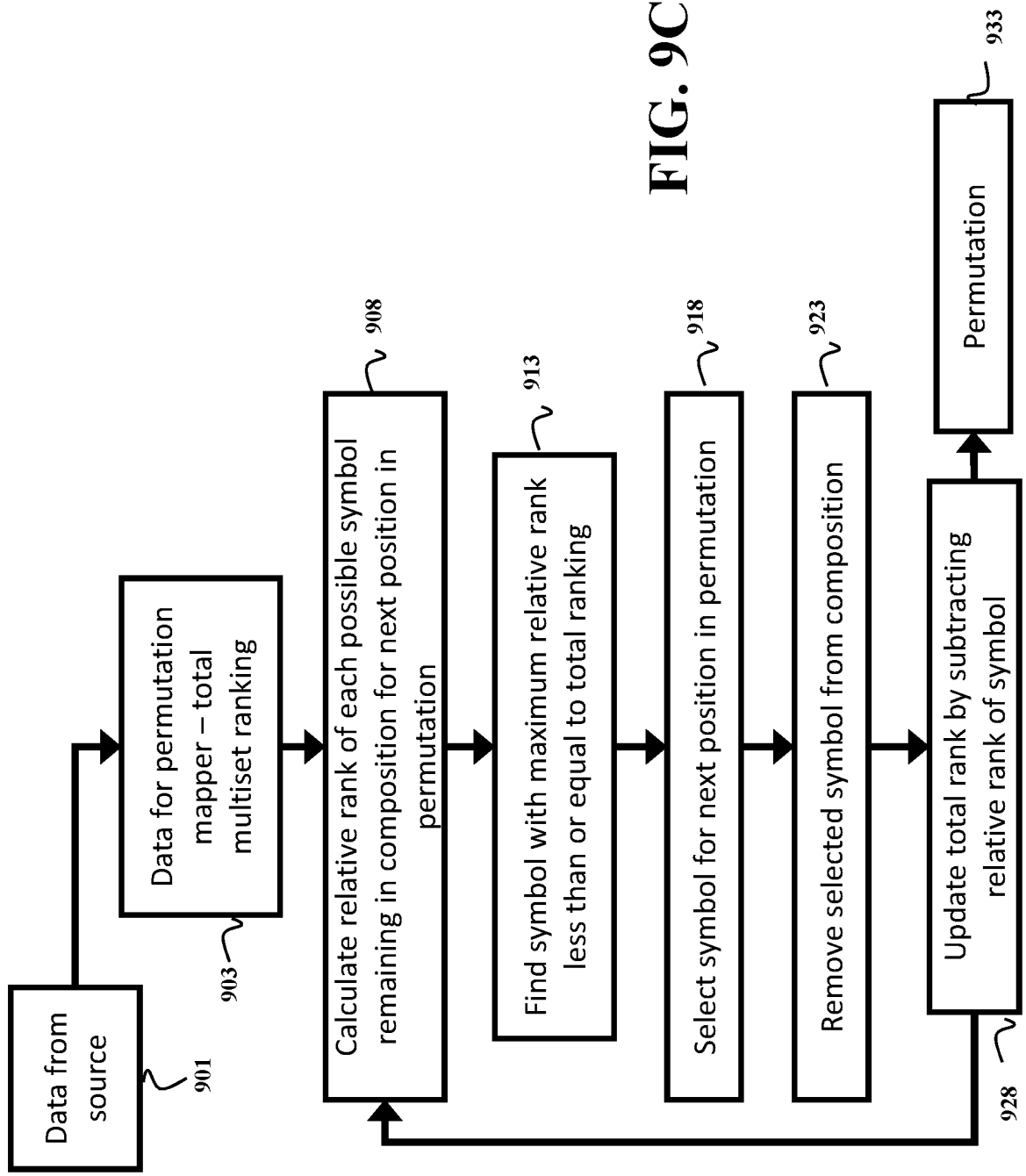
FIG. 9C shows a schematic of the multiset ranking method for permutation mapping according to one embodiment.

FIG. 9C shows a schematic of the multiset ranking method for permutation mapping according to one embodiment. Data from a source (901) provides the input, and will be considered as the total multiset ranking of the permutation to be generated (903). The multiset ranking is the rank of the permutation under consideration in a lexicographically ordered list of every possible permutation of the composition under consideration. The relative rank is calculated for each possible symbol occurring in the next position in the permutation (908), and the symbol with maximum relative rank not greater than the total ranking is chosen (913), and inserted in to the next position in the permutation (918). This relative rank for multisets is considered as one more than the total number of permutations with rank less than the considered one for a certain one element constraint. For example, considering a composition with M total elements, cardinality 4, and m(1), m(2), m(3) and m(4) respectively of the four possible symbols, whose ordering is {1,2,3,4}, the relative rank for the first symbol being m(1) is trivially 1. The relative rank for the first symbol being m(2) is M!/(m(1)−1)!/m(2)!/m(3)!/m(4)!+1. The relative rank for the first symbol being m(3) is M!/m(1)!/(m(2−)1)!/m(3)!/m(4)!+M!/(m(1)−1)!/m(2)!/m(3)!/m(4)!+1, and so on. The one instance of the selected symbol is then removed from the composition (923), and the total rank is updated by subtracting the relative rank of the selected symbol (928). If more symbols are to be processed, new relative ranks are calculated to each possible symbol remaining in the composition for the next position in the permutation (908). If there are no more symbols to be processed, the permutation is complete (933).

Figure 9D:
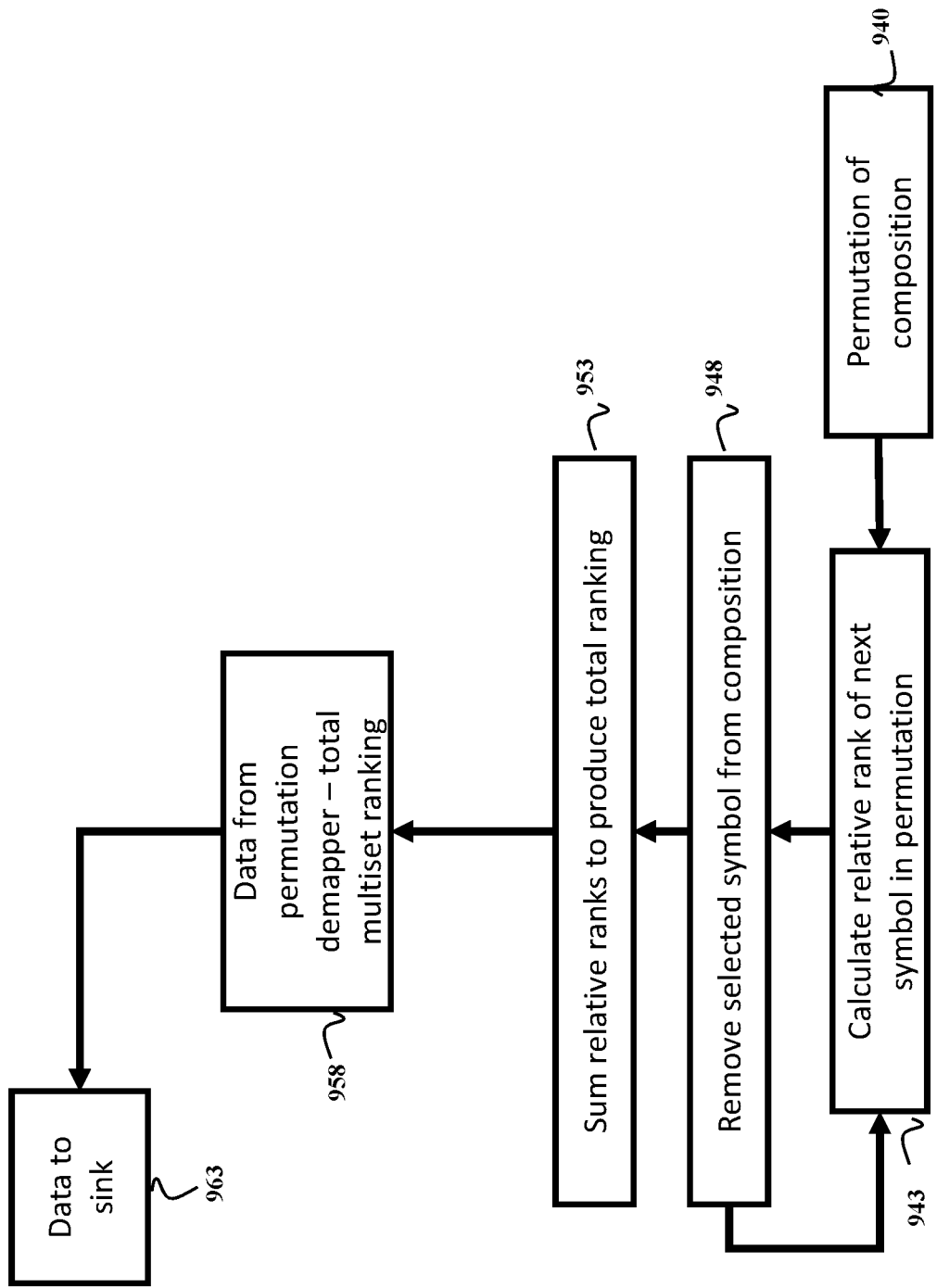
FIG. 9D shows a schematic of the multiset ranking method for permutation demapping according to one embodiment.

FIG. 9D shows a schematic of the multiset ranking method for permutation demapping according to one embodiment. A permutation is received (940) and processed. The relative rank of the next symbol in the permutation is calculated (943), this symbol is then removed from the composition under consideration (948), and the relative rank of the next symbol in the permutation is calculated (943). When all symbols have been processed, their relative ranks are summed (953) to produce a total ranking. This data forms the permutation demapping data (958), and is sent on to a data sink (963).

Figure 10B:
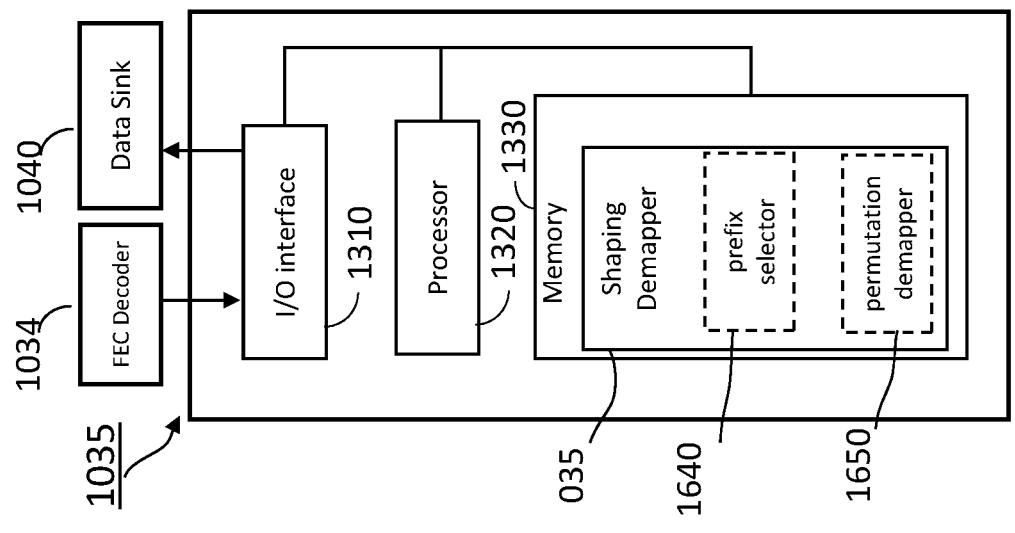
FIG. 10B shows a schematic of shaping demapper unit according to some embodiments.
Figure 10A:
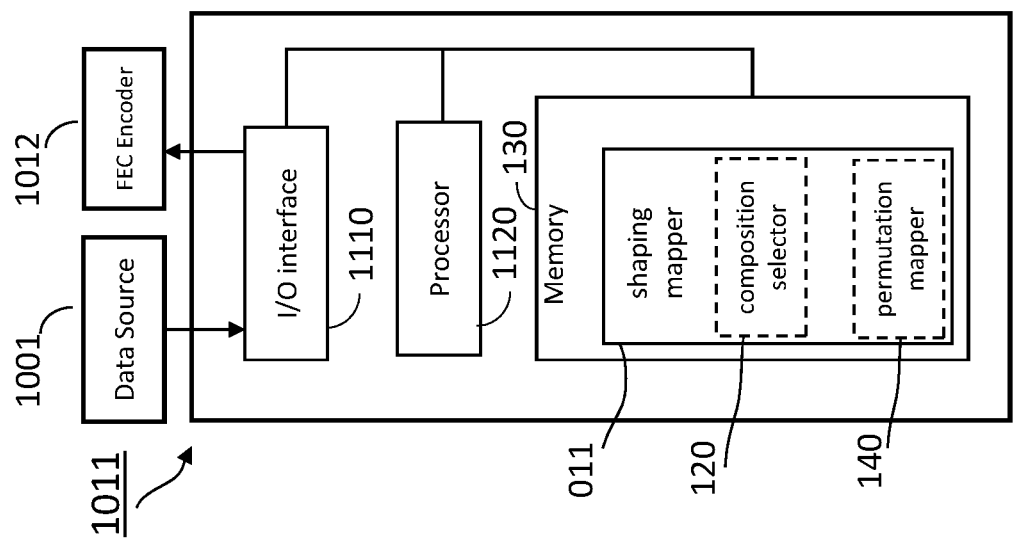
FIG. 10A shows a schematic of a shaping mapper unit according to some embodiments.

FIG. 10A shows a schematic of a shaping mapper unit (1011) according to some embodiments. Data from a source (1001) is acquired by an input/output interface (1110), which sends input block of bits forming the data for processing by a processor (at least one processor or digital signal processor) (1120). The processor (1120) is operatively connected to memory (130) storing a shaping mapper 011 including a composition selector 120 and permutation mapper 140. After processing, data is sent from the interface (1110) to the FEC encoder (012).

FIG. 10B shows a schematic of shaping demapper unit (1035) according to some embodiments. Data from an FEC decoder (1034) is sent via an interface (1310) to be processed in a processor (at least one processer or digital signal processor) (1320). It is processed with data stored in memory (1330) storing the shaping demapper (035) including a prefix selector (1640) for performing the calculation 640, and a permutation demapper (1650) for performing the demapping 650 (1340). After processing, the data is sent via an interface (1310) to the data sink (1040).

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A communication system, comprising:
an input interface configured to receive an input block of bits;
a memory to store a prefix tree that maps a dyadic distribution of compositions of output symbols to prefixes of variable lengths, wherein a path from a root node of the prefix tree to each leaf of the prefix tree is defined by a prefix formed by a unique sequence of binary values of a length that is equal to a depth of the leaf, wherein each leaf in the prefix tree is associated with a composition that has at least a number of unique permutations equals to two in a power of a length of a suffix defined by a difference between the length of the block of input bits and the length of the prefix of the leaf, wherein compositions in the dyadic distribution of compositions are selected to reduce one or combination of energy and kurtosis of transmission;
a processor configured to execute a composition selector to select a composition identified in the prefix tree by a prefix in the input block of bits and to execute a permutation mapper to permute the selected composition according to a suffix in the input block of bits; and
a transmitter front end configured to transmit the permuted composition over a communication channel.

2. The communication system of claim 1, wherein the length of the input block of bits defines an energy bound, wherein the energy bound is a minimum energy allowing a number of compositions having a number of permutations sufficient to encode the input block of bits and having energy not greater than the energy bound, wherein the dyadic distribution of compositions includes at least one composition with energy greater than the energy bound that replaces in the dyadic distribution of compositions a composition with energy below the energy bound but having a kurtosis above a threshold.

3. The communication system of claim 1, wherein the compositions in the dyadic distribution have a minimum total energy for a total kurtosis.

4. The communication system of claim 1, wherein the compositions in the dyadic distribution have a minimum total kurtosis for a total energy.

5. The communication system of claim 1, wherein the communication channel is an optical fiber channel, wherein a total energy of the compositions in the dyadic distribution is a second statistical moment of transmission over the optical fiber channel, wherein a total kurtosis of the compositions in the dyadic distribution is a fourth statistical moment of the transmission over the optical fiber channel, wherein a sixth statistical moment of the transmission of the optical fiber channel is a hypertailedness, and wherein the compositions in the dyadic distribution are selected to maximize a function relating a signal to noise ratio (SNR) of the optical fiber channel to the total energy, the total kurtosis, and the hypertailedness, wherein parameters of the function are properties of the optical fiber channel.

6. The communication system of claim 5, wherein the function is an extended Gaussian noise model of the optical fiber channel.

7. The communication system of claim 1, wherein the permutation mapper permutes the selected composition using an arithmetic coding for a constant composition distribution matching, wherein the suffix in the input block of bits is an input vector to the arithmetic coding.

8. The communication system of claim 1, wherein the permutation mapper permutes the selected composition using a multiset ranking mapping between the input block of bits and the permuted composition.

9. The communication system of claim 1, wherein the permutation mapper permutes the selected composition using at least two parallel binary mappings between at least two subsets of the input block of bits and at least two binary permutations of the composition.

10. The communication system of claim 1, wherein each leaf is associated with a unique composition.

11. The communication system of claim 1, wherein at least some compositions in the prefix tree have multiple occurrences, and wherein each leaf is further associated with a rank offset, such that a combination of the composition with its rank offset is unique to the prefix tree, and wherein the rank offset of each leaf is equal to sum of power of two of lengths of suffixes of leafs of lower depth associated with the same composition.

12. The communication system of claim 11, wherein the permutation mapper permutes the selected composition according to a sum of the suffix in the block of input bits and the rank offset.

13. The communication system of claim 1, further comprising:
an FEC encoder to transform the permuted composition to a block of shaped bits with non-uniform distribution of bits, to generate uniformly distributed parity bits from the block of shaped bits, to combine the parity bits with the bits of the blocks of shaped bits; and
a modulator to modulate the blocks of shaped bits onto amplitude bits of QAM symbols for analog transmission over the communication channel.

14. A communication method for transmitting a block of input bits over a communication channel, wherein the method uses a processor coupled to a memory storing a prefix tree that maps a dyadic distribution of compositions of output symbols to prefixes of variable lengths, wherein a path from a root node of the prefix tree to each leaf of the prefix tree is defined by a prefix formed by a unique sequence of binary values of a length that is equal to a depth of the leaf, wherein each leaf in the prefix tree is associated with a composition that has at least a number of unique permutations equals to two in a power of a length of a suffix defined by a difference between the length of the block of input bits and the length of the prefix of the leaf, wherein compositions in the dyadic distribution of compositions are selected to reduce one or combination of energy and kurtosis of transmission, wherein the processor is coupled with stored instructions implementing the method, wherein the instructions, when executed by the processor carry out steps of the method, comprising:
selecting a composition identified in the prefix tree by a prefix in the input block of bits;
permuting the selected composition according to a suffix in the input block of bits; and
transmitting the permuted composition over a communication channel.

15. The communication method of claim 14, wherein the length of the input block of bits defines an energy bound, wherein the energy bound is a minimum energy allowing a number of compositions having a number of permutations sufficient to encode the input block of bits and having energy not greater than the energy bound, wherein the dyadic distribution of compositions includes at least one composition with energy greater than the energy bound that replaces in the dyadic distribution of compositions a composition with energy below the energy bound but having a kurtosis above a threshold.

16. The communication method of claim 14, wherein the compositions in the dyadic distribution have a minimum total energy for a total kurtosis.

17. The communication method of claim 14, wherein the compositions in the dyadic distribution have a minimum total kurtosis for a total energy.

18. The communication method of claim 14, wherein the communication channel is an optical fiber channel, wherein a total energy of the compositions in the dyadic distribution is a second statistical moment of transmission over the optical fiber channel, wherein a total kurtosis of the compositions in the dyadic distribution is a fourth statistical moment of the transmission over the optical fiber channel, wherein a sixth statistical moment of the transmission of the optical fiber channel is a hypertailedness, and wherein the compositions in the dyadic distribution are selected to maximize a function relating a signal to noise ratio (SNR) of the optical fiber channel to the total energy, the total kurtosis, and the hypertailedness, wherein parameters of the function are properties of the optical fiber channel.

19. The communication method of claim 18, wherein the function is an extended Gaussian noise model of the optical fiber channel.

20. The communication method of claim 14, wherein at least some compositions in the prefix tree have multiple occurrences, and wherein each leaf is further associated with a rank offset, such that a combination of the composition with its rank offset is unique to the prefix tree, and wherein the rank offset of each leaf is equal to sum of power of two of lengths of suffixes of leafs of lower depth associated with the same composition.

* * * * *